(12) United States Patent
Mavrov et al.

(10) Patent No.: US 9,141,663 B2
(45) Date of Patent: Sep. 22, 2015

(54) USER INTERFACE AND METHODS FOR BUILDING STRUCTURAL QUERIES

(75) Inventors: Robert Mavrov, Prague (CZ); Marek Obitko, Kladno (CZ); Michal Fortik, Varnsdorf (CZ); Ivan Havel, Prague (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 602 days.

(21) Appl. No.: 12/334,913

(22) Filed: Dec. 15, 2008

(65) Prior Publication Data

US 2010/0153412 A1    Jun. 17, 2010

(51) Int. Cl.
    *G06F 17/30* (2006.01)
(52) U.S. Cl.
    CPC ................ *G06F 17/30392* (2013.01)
(58) Field of Classification Search
    USPC ......................................... 707/758
    See application file for complete search history.

(56) References Cited

U.S. PATENT DOCUMENTS

| | | | |
|---|---|---|---|
| 5,774,374 A | 6/1998 | Scott et al. | |
| 6,490,581 B1* | 12/2002 | Neshatfar et al. ........... | 1/1 |
| 6,535,229 B1* | 3/2003 | Kraft ........................... | 715/764 |
| 7,912,561 B2 | 3/2011 | Hsiung et al. | |
| 8,028,272 B2 | 9/2011 | Eldridge et al. | |
| 2002/0169768 A1* | 11/2002 | Lowe et al. ................. | 707/4 |
| 2003/0163455 A1* | 8/2003 | Dettinger et al. ........... | 707/3 |
| 2005/0004911 A1* | 1/2005 | Goldberg et al. ........... | 707/7 |
| 2005/0015364 A1* | 1/2005 | Payton et al. ................ | 707/3 |
| 2005/0114288 A1* | 5/2005 | Dettinger et al. ........... | 707/1 |

(Continued)

OTHER PUBLICATIONS

Mulani, J. et al; "A graphical navigator for viewing databases"; Software Practice & Experience, 1996 Wiley & Sons, Bognor Regis, GB, vol. 26, No. 4, Apr. 1, 1996; pp. 411-426.

(Continued)

*Primary Examiner* — Mahesh Dwivedi
(74) *Attorney, Agent, or Firm* — Whyte Hirschboeck Dudek S.C.

(57) ABSTRACT

Disclosed herein is a user interface and methods for building a formulated query to search a database of structural data which is organized by classes, attributes of classes, literals of attributes, and structural relations between classes. The user interface can display results of the formulated query and includes a structural query section to define constraints for the formulated query. The structural query section includes one or more query elements to be populated and a means for adding one or more additional query elements, wherein each query element can have a class portion which is populated by designating one of a special class identifier and a concrete class identifier, and can have one or more attribute and literal portions. The class portion can be populated by designating the class identifier from an offered list, and the user interface can further include an offer section which displays the offered list. The offered class identifiers, relation identifiers, attribute identifiers and literal values can come from the particular searched structural data. The offered class identifiers, relation identifiers and attribute identifiers can come from the definition of the structural content of the searched data. A relationship between query elements is expressible using a defined structural relation, such as a "contains" relation. Relationships between two or more query elements or two or more query element attribute-literal pair portions are also expressible using logical relations, such as a logical "AND" relation, a logical "OR" relation, and a logical "XOR" relation. A query results section displays results of the formulated query after the formulated query is executed.

32 Claims, 21 Drawing Sheets

(56) References Cited

U.S. PATENT DOCUMENTS

| | | | | |
|---|---|---|---|---|
| 2005/0131889 | A1* | 6/2005 | Bennett et al. | 707/4 |
| 2005/0187911 | A1* | 8/2005 | Tunning | 707/3 |
| 2005/0192953 | A1* | 9/2005 | Neale et al. | 707/4 |
| 2006/0294089 | A1* | 12/2006 | Devost et al. | 707/4 |
| 2007/0169768 | A1 | 7/2007 | Chung | |
| 2008/0288869 | A1* | 11/2008 | Ubillos | 715/716 |
| 2009/0177603 | A1 | 7/2009 | Honisch | |
| 2010/0082669 | A1 | 4/2010 | Obitko et al. | |
| 2010/0138017 | A1* | 6/2010 | Vrba et al. | 700/97 |

OTHER PUBLICATIONS

Murray, N; Paton, N; Gobel, C.; "Kaleidoquery: A visual query language for object databases" Proceedings of the Working conference on Advanced Visual Interfaces, 1998, pp. 247-257, USA, May 1998.
Santucci, G. et al: "Query by Diagram: A visual environment for querying databases" Software Practice & Experience, 1993 Wiley & Sons, Bognor Regis. GB, vol. 23, No. 3, Mar. 1, 1993.
Lam, H. et al: "A graphical interface for an object-oriented query language", Computer Software and Applications conference, 1990, Compsac 90, Proce Edings, 14th Annual International, Chicago, IL USA, Oct. 31, 1990, IEEE; Los Alamitos, CA, USA, pp. 231-237.
Batini, C. et al: "Visual strategies for querying databases", Visual Languages 1991, Proceedings, 1991, IEEE Workshop on Kobe, Japan Oct. 9-11, 1991, Los Alamitos, CA USA, IEEE Comput. Soc., Oct. 8, 1991, pp. 183-189.
International Search Report; Application No. 09179071.7-2201; Mar. 30, 2010; 8 pages.
EP Patent Application No. 09179071.7; European Patent Office Communication; Apr. 12, 2010; 8 pages.
Hearst, M. et al; "Finding the Flow in Web Site Search"; Communications of the ACM—vol. 45, No. 9; Sep. 2002; pp. 42-49.
Yee, K. et al; "Faceted Metadata for Image Search and Browsing"; CHI Annual Conference—Ft. Lauderdale, Florida; Apr. 5-10, 2003; pp. 401-408.
Hearst, M.; "Clustering Versus Faceted Categories for Information Exploration"; Communications of the ACM—vol. 49, No. 4; Apr. 2006; pp. 59-61.
Resource Description Framework (RDF)—Semantic Web Standards; http://www.w3.org/RDF; Feb. 10, 2004; 3 pages.
RDF Primer—W3C Recommendation; http://www.w3.org/TR/rdf-primer; Feb. 10, 2004; 109 pages.
SPARQL Query Language for RDF—W3C; http:www.w3.org/TR/rdf-sparql-query; © 2006-2007; 103 pages.
W3C Recommendation—XQuery 1.0 and XPath 2.0 Functions and Operators; Section 7.6.1; http://www.w3.org/TR/2007/REC-xpath-functions-20070123/#regex-syntax; Jan. 2007; 6 pages.
Adobe Flex, Open-source Framework; http://www.adobe.com/products/flex.html; 2 pages; accessed from the internet on Jul. 20, 2012—admitted prior art.
Resource Description Framework (RDF)—Wikipedia; http://en.wikipedia.org/wiki/Resource_Description_Framework; 13 pages; accessed from the internet on Jul. 23, 2012—admitted prior art.
Faceted Search—Wikipedia; http://en.wikipedia.org/wiki/Faceted_Search; 3 pages; accessed from the internet on Jul. 20, 2012—admitted prior art.
SQL—Wikipedia; http://en.wikipedia.org/wiki/SQL; 17 pages; accessed from the internet on Jul. 23, 2012—admitted prior art.
SPARQL—Wikipedia; http://en.wikipedia.org/wiki/Sparql; 4 pages; accessed from the internet on Jul. 23, 2012—admitted prior art.
Obitko, Marek, Translations Between Ontologies in Multi-Agent Thesis, Dissertation Thesis, Feb. 2007, Czech Technical University in Prague Faculty of Electrical Engineering Department of Cybernetics, pp. 1-139.
The Tabulator: Generic Data Browser; http://www.w3.org/2005/ajar/tab; printed Mar. 10, 2009; 2 pages.
OWL Web Ontology Language Overview; http://www.w3.org/TR/owl-features; Feb. 10, 2004; 18 pages.
Relational Database; http://en.wikipedia.org/wiki/Relational_database; printed Nov. 2, 2012; 6 pages.
Relational Model; http://en.wikipedia.org/wiki/Relational_model; printed Nov. 2, 2012; 1 page.
SPARQL vs. SQL—Intro; Cambridge Semantics; http://www.cambridgesemantics.com/semantic-university/sparql-vs-sql-intro; printed Nov. 2, 2012; 9 pages.
Pull Technology; http://en.wikipedia.org/wiki/Pull_technology; printed Nov. 2, 2012; 1 page.
Pixmania—online shopping, low prices & discounts on high tech products; http://www.pixmania.co.uk; printed Nov. 2, 2012; 13 pages.
Obitko, M. et al: "Semantic Web Technologies in Manufacturing Systems"; Czech Technical University; Jun. 1, 2007; 12 pages.
Obitko, M. et al: "Semantics in Industrial Distributed Systems"; International Federation of Automatic Control; Jul. 2008; 8 pages.
Adkisson, H.: "Use of Faceted Classification"; http://www.webdesignpractices.com/navigation/facets.html; © 2005; 4 pages.
Faceted Browser; Massachusetts Institute of Technology; http://simile.mit.edu/wiki/Faceted_Browser; © 2003-2008; 2 pages.
Google Desktop Search (GDS); http://en.wikipedia.org/wiki/Google_Desktop; printed Nov. 13, 2012, admitted prior art; 8 pages.
Inside Google Desktop; http://googledesktop.blogspot.co.uk/; printed Nov. 13, 2012, admitted prior art; 5 pages.
Windows Desktop Search (WDS ); http://en.wikipedia.org/wiki/Windows_Search; printed Nov. 13, 2012, admitted prior art; 11 pages.
RSLogix 5000 Design & Configuration; Rockwell Automation; http://www.rockwellautomation.com/rockwellsoftware/design/rslogix5000/; printed Nov. 13, 2012, admitted prior art; 1 page.
FactoryTalk View Performance & Visibility; Rockwell Automation; http://www.rockwellautomation.com/rockwellsoftware/performance/view/; printed Nov. 13, 2012, admitted prior art; 1 page.
MSDN FindFirstChangeNotification function; http://msdn.microsoft.com/en-us/library/aa364417%28VS.85%29.aspx; printed Nov. 13, 2012, admitted prior art; 5 pages.
Code Project—How to get a notification if change occurs in a specified directory; http://www.codeproject.com/Articles/4692/How-to-get-a-notification-if-change-occurs-in-a-sp; printed Nov. 13, 2012, admitted prior art; 7 pages.
EP Communication for Application No. 09179071.7 dated Jan. 10, 2010, 3 pages.
EP Communication for Application No. 09179071.7 dated Apr. 1, 2011, 1 page.
Notice of Allowance for U.S. Appl. No. 13/875,931 dated Oct. 29, 2014, 5 pages.
Notice of Allowance for U.S. Appl. No. 13/875,931 dated Nov. 26, 2014, 5 pages.
Non-final office action for U.S. Appl. No. 13/875,931 dated Jul. 23, 2013, 5 pages.
Non-final office action for U.S. Appl. No. 13/875,931 dated Dec. 6, 2013, 8 pages.
Final office action for U.S. Appl. No. 13/875,931 dated Jun. 10, 2014, 10 pages.
Non-final office action for U.S. Appl. No. 12/241,734 dated Jun. 21, 2011, 9 pages.
Final office action for U.S. Appl. No. 12/241,734 dated Jan. 26, 2012, 9 pages.
Non-final office action for U.S. Appl. No. 12/241,734 dated Jun. 27, 2012, 9 pages.
Final office action for U.S. Appl. No. 12/241,734 dated Nov. 21, 2012, 9 pages.
Notice of Allowance for U.S. Appl. No. 12/241,734 dated Jan. 11, 2013, 6 pages.

* cited by examiner

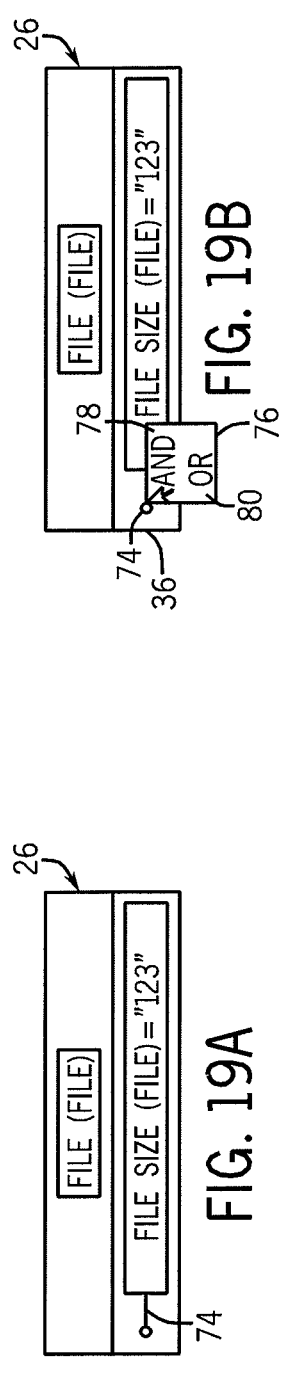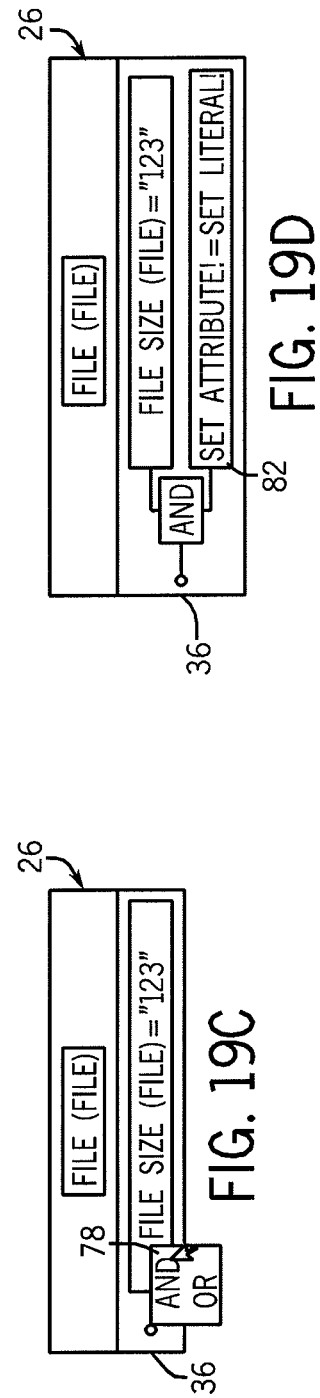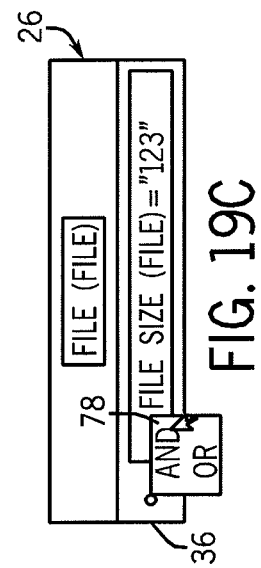

USER INTERFACE AND METHODS FOR BUILDING STRUCTURAL QUERIES

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to a user interface and methods for building structural queries.

BACKGROUND OF THE INVENTION

Industrial automation or control systems include controllers to monitor and control machinery in a manufacturing process, as well as human machine interfaces (HMI) to allow operators to interact with the controllers or other devices in the systems. A controller of this type typically is a special purpose computer that runs a stored control program in a specific programming language in real-time. The controller examines a series of inputs, typically from sensors, reflecting the status of a controlled machine or process and, based on the logic of the control program, generates outputs in the form of electrical signals to control actuators or the like to control the machine or process. One type of controller is a programmable logic controller (PLC), which typically runs under the direction of a ladder logic program that includes instructions or statements which define relationships between an output variable and one or more input variables. In ladder logic programs, the input and output variables can be represented graphically as contact symbols and coil symbols arranged in a series of rungs running between a pair of vertical power rails, and it is common to represent and view these programs graphically.

Industrial control systems can store a significant amount of data of various types and taking a variety of forms, including for example, HMI display graphic files (GFX), HMI project configurations, PLC files with ladder logic code, network configuration, file attributes and file metadata, for example New Technology File System (NTFS) metadata. Much of this data is stored in associated data files on file systems in one or more locations. The industrial devices can also generate a significant amount of data relevant to the operation of the manufacturing process, such as data from sensors or data indicative of various events, including alarms that can occur in the control system. This industrial data can be relevant and useful to an operator such as a control system designer or control system administrator in order to design new systems, add components, design new programs or interfaces, or troubleshoot problems.

Industrial data of these types can be converted to a structural data form and stored in a structured database. Various structural data forms exist, such as for example, XML (extensible markup language), OWL (web ontology language), or RDF (resource description framework) formats. Searching a structured database, such as an RDF-Schema (RDFS) or OWL configured database, requires knowledge of a specialized and complex query language, such as SPARQL (query language for RDF). SPARQL can thus be used to produce queries for searching an RDF representation of file content, including content representative of ladder logic programs, graphic files, etc. For querying XML databases, specialized and complex query languages, such as XQuery and XPath are also required. To be able to query databases containing structural data using the above mentioned query languages directly, a user would have to be familiar with the relations and hierarchy between the data, which are stored in the database, and also with the names of items forming the structure (e.g., names of classes and their attributes), and with the content and format of values (e.g., strings, numbers, dates).

When performing such a search, a user will often have to become familiar with numerous types of objects (such as for example "Tags"), their properties (attributes), values of these properties, and with reciprocal relations between the objects, which form a hierarchical structure. The aforementioned "Tags" are commonly used for identification of a memory unit in a particular device. Without the knowledge of the specific object types, their properties, values assigned to the properties, and relations used on particular devices or in particular file types (such as HMI files), search requests may continually fail to produce any results, even if a user is well versed in the complex query language.

Accordingly, it would be desirable to provide a method for generating structural queries for industrial or any other data which does not require extensive knowledge of searched object types, their properties, values of the properties, relations used in the structure, and a complex query language. It would further be desirable to provide a method for generating structural queries which overcomes the limitations of conventional searching techniques resulting from unfamiliarity with the variables used in conjunction with the various devices or files.

BRIEF SUMMARY OF THE INVENTION

The invention relates to a user interface and methods for building structural queries which allow a user to build such queries seamlessly and without the need to be familiar with the structure and the content of the searched data which is stored in a database and without the need to be familiar with a complex query language. Using the interface, a user can build structural queries without the need to formulate them directly in the complex query language.

The data searched by a formulated structural query are expected to have a structural form that includes containers (classes), which can have, but need not have, one or more properties (attributes). Containers (classes) are structurally related to other containers (classes), forming a hierarchical data structure. Properties (attributes) can have, but need not have, one or more values (literals). Each class has identification, e.g., a name of that class, which is not treated as a property of that class. Similarly, each attribute has identification, e.g., a name of that attribute. As used herein, the nomenclature of containers, properties of containers, and values of properties is considered essentially equivalent to classes, attributes of classes, and literals of attributes, as illustrated and described in the example below.

A structural query can be built step by step by defining constraints in one or more query elements, and defining a structure of query elements by expressing relationships between them using one or more defined interconnections including structural relations and logical relations. A query element is a construction block of the structural query and initially includes one or more portions to be filled in or populated. The query element portions can include a class portion for designating a class (using an identifier) and one or more other portions for designating an attribute and possibly a literal. A populated query element thus expresses constraints possibly for a class and possibly for its attributes and literals assigned to those attributes. If present, each class portion can be populated with a concrete class identifier or a special class identifier. If present, an attribute portion, a literal portion, or an attribute-literal pair portion can be populated in a similar manner. Automatic default designations can also exist. For example, if an attribute portion is populated, a class portion can automatically be populated by an "ANY CLASS" item. Relationships between query element portions can be expressed using one or more logical relations.

In particular, concrete identifiers include names of structural relations, names of classes, names of attributes, or specific values of literals such as number, string, date etc. Special identifiers essentially act as "wild-cards", able to replace any class, attribute, literal or structural relation. For example, using a special class identifier to populate a class portion in a query element can express that the user doesn't care about the names of classes possible at the appropriate structural position in the query. The same is true for an attribute portion of a query element or a literal portion of a query element, where the user doesn't care about the names of attributes of the appropriate class, or the literals for some attribute. The same can be true for existing relations in a given structure position. However, a special identifier can also be used to mark a position in the query, values of which a user doesn't know, but wants to find. This special identifier can be called for example variable and has assigned an identifier, such as a variable name, allowing one to distinguish individual variables. Values or combinations of values corresponding to defined variables represent query results. A query can be run using the so-far defined constraints to generate query results which provide available concrete values (identifiers of classes, attributes and relations, or values of literals) for variables with respect to the so-far defined constraints.

The user interfaces and methods described herein allow the construction of structural queries by providing a means to define an overall structure of one or more query elements and a means to fill-in (populate) the query elements in a way that a user can only enter or select parameters to ensure the correctness and validity of the query, and/or in a way to ensure that at least some results to the formulated structural query will be obtained. One way to ensure that at least some results will be obtained can be achieved by offering selectable items (e.g., names of classes, names of attributes, names of relations, and values of literals) to the user for the query construction which items come from the actual data in the searched database. Ensuring the correctness and validity of the query can be achieved by defining a query element using the definition of the structural content of the searched data, i.e., not the actual searched data themselves, but their formal descriptions. In this case it is ensured that the formulated query will be syntactically and structurally correct, but not that it will return at least some results, because the actual data in the database doesn't necessarily have to fulfill all the possible patterns allowed by the structural definition. Also, in at least one embodiment, such as that illustrated and described below, at least some concrete literal values (such as a number or date) have to be manually entered, so neither their existence nor the correctness of their format is ensured.

Query elements can be interconnected using one or more defined structural relations, such as a "contains" relation, so forming a hierarchical structure. The "contains" relation is transitive, which means that when class A contains class B which contains class C, then class A contains class C. This shortened pattern can be used in a query instead of a complete listing of the paths between classes.

To express other constraints between query elements, other defined interconnections are available, including various logical relations such as a logical "AND", a logical "OR", a logical "eXclusive OR" ("XOR"), and possibly also other logical relations. The logical relation can interconnect query elements or portions within a query element to form a logical hierarchical structure. Classes connected with a logical relation or with a structure of logical relations are on the same structural hierarchical level. Similar to logical relations between classes, there can also be a logical relation or a structure of logical relations between attributes of a class. Additionally, there is a mathematical relationship defined between an attribute and its literal or group of literals, using mathematical operators including for example an equals operator, a not equals operator, a greater than operator, a less than operator, a greater than or equal to operator, a less than or equal to operator, string operators (e.g. substring), operators working with a set (e.g. one of a set) or working with a range (e.g. interval), etc.

The structure of the query is composed from query elements interconnected by structural and logical relations defined between them, as described above. A defined structure can be expanded in any direction. New query elements can be added as superior to already defined query elements, as inferior to already defined query elements, or they can be positioned inside the current structure, i.e. inferior to some query elements and superior to query elements previously directly inferior to their new directly superior query elements. A new logical relation can be created, or an existing logical relation, e.g. logical "AND" and/or logical "OR" can be extended by a new sibling query element.

When a new query element is created, it has to be filled with values (populated). As mentioned above, to make the query building process easy, seamless and secure, it is desirable to guide the user to construct a valid query, i.e., to construct structures of query elements (e.g., interconnected with structural relations) and to fill query elements with parameters (e.g., names of classes, names of attributes and values of literals), which ensures that for the structural query there exist corresponding data in the database, i.e., the formulated query matches some data in the database. One way to achieve this safe query building is to provide for query building only those parameters, which are really available in the searched data, and to do this with concern to the already defined query, i.e., with concern to the already existing constraints. Using this method, when editing a query element portion (class name, attribute name or literal value) or adding a new query element or editing a structural relation, the user is provided with suitable items for the particular position in the query (class names, attribute names, literal values, relations), which can be obtained from the data stored in the database, e.g. by an "explorative" query. This approach incorporates data exploration or browsing—the user is able to navigate through the searched data as the query is constructed. This is especially important when the user has only a vague notion of how to formulate a desired query.

Another possibility to build the structural shape of the query without having to instantly query the database is using the definition of the structural content of the searched data, i.e. not the searched data themselves, but their formal description. Using this approach, the classes, attributes and relations, which each play a role in the formal definition, can be filled, while literal values will likely have to be entered manually, as they are not part of the formal structural definition. A query built with the use of the formal structural definition is always syntactically and structurally correct, because it doesn't allow other constructions than those permitted by the definition. But because the real data in the database doesn't have to implement all the possible patterns allowed by the formal structural definition and the manually entered literal values don't have to exist or they may have a wrong format, it is not ensured that there will exist matching data for the query pattern in the database. In other words, although the query can be correctly formatted, in some cases, the query will not produce any data results.

Other embodiments, aspects, features, objectives and advantages of the present invention will be understood and appreciated upon a full reading of the detailed description and the claims that follow.

BRIEF DESCRIPTION OF THE DRAWINGS

Embodiments of the invention are disclosed with reference to the accompanying drawings. The drawings are for illustrative purposes only and show one of the possible implementations of the principles and methods of seamless and safe building of structural queries. The invention is not limited in its application to the details of construction or the arrangement of the components illustrated in the drawings. The invention is capable of other embodiments or of being practiced or carried out in other various ways. Like reference numerals are used to indicate like components. In the drawings:

FIGS. 2-21 are output screen views of the exemplary user display of FIG. 1.

DETAILED DESCRIPTION OF PREFERRED EMBODIMENTS

Figure 1:
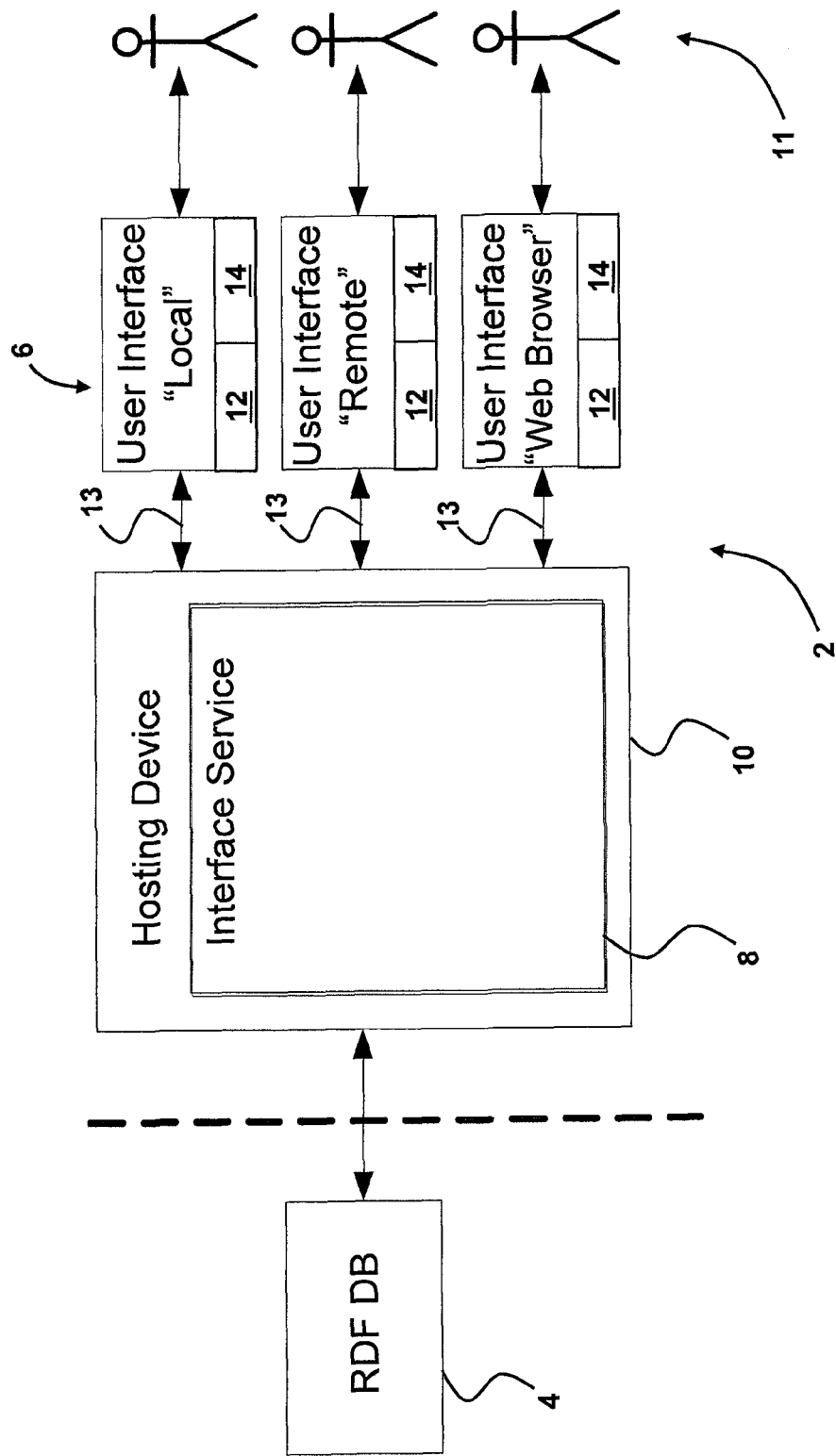
FIG. 1 is a schematic diagram of an exemplary user interface architecture for generating structural queries.

Referring to FIG. 1, exemplary user interface architecture 2 is depicted in communication with a database 4 (which in some embodiments can be multiple databases) containing structural data. The user interface architecture 2 includes one or more interface portals 6 (three being shown in this example) in communication with an interface service 8 (software application) which can for example run either as a stand-alone application on a hosting device 10 or as a web-service hosted by an application server. As a general overview, each user interface portal 6 can be operated by a respective user 11 to access the interface service 8 and build a formulated query. The formulated query includes one or more query elements, such as a class portion, wherein the class portion is populated by designating a concrete identifier or a special identifier. The class portion can be automatically populated with a default item. Relationships between two or more query elements can be expressed using defined structural relations or defined logical relations. Further, a query element can include, in addition to a class portion, additional portions to be populated, including one or more attribute portions, and one or more literal portions. The attribute portions within a query element can be similarly interconnected using logical relations. Between an attribute and a literal there is a mathematical relation. The attribute portion and the literal portion are populated by designating a concrete identifier or a special identifier. The attribute portion and the literal portion can also be automatically populated with a default item. The formulated query can be evaluated by the interface service 8, which searches the database 4 to produce results which can be displayed on a respective user display 12 of user interface portal 6.

In particular, the database 4 contains structural data such as industrial data compiled in a structural format. Various structural formatting protocols can be used, for example, Extensible Markup Language (XML), Resource Description Framework (RDF), a Web Ontology Language (OWL) or RDF-Schema (RDFS). In at least one embodiment, the structural data uses RDF to provide classes, attributes and literals. Additionally, the structural data can have structural relationships, such as a "contains" relation, defined between the classes.

Further referring to FIG. 1, each interface portal 6 includes both the respective user display 12 and a respective user input device 14. The respective user display 12 of each respective interface portal 6 is used to view one or more output screens (see FIGS. 2-21) rendered by a client application and driven by the interface service 8. Each user display 12 can be one of various user viewing devices, for example, a monitor, such as found associated with a desk top or laptop personal computer, or an industrial monitor, such as a PanelView or a VersaView display as manufactured by Rockwell Automation, Inc. of Milwaukee, Wis. Each user input device 14 is used to enter commands and enter or select query parameters and values from the output screens provided (driven) by the interface service 8, and can include one of various components suitable for selecting a portion of a screen viewed on the user display 12 and/or entering data, for example, a mouse pointing device, a joystick, a keyboard, or a touch-screen monitor interface. In addition, in some embodiments, the user display 12 and user input device 14 can be associated with a single device, such as a personal computer, a touch-screen monitor, a PDA, or a mobile phone.

The interface service 8 operates to generate screen content for each respective interface portal 6 such that one or more formulated queries can be generated using the respective interface portal 6 under the direction of the respective user 11. The interface service 8 also operates to process the formulated queries, access the database 4 to obtain query results, and communicates the results to the interface portal 6 to be displayed. The interface service 8 further operates to provide one or more offered lists of possible items which can be displayed on the interface portal 6, and list of available actions, allowing a user to build structural queries including desired constraints and to essentially browse the structural data located on the database 4, as further described below.

The hosting device 10, within which the interface service 8 is shown to be situated, can take a variety of forms. For example, it can be a computer (or other microprocessor based controller) including a networked computer hard drive. Alternatively, the interface service 8 can instead be situated on a computerized device having one or more of numerous digital data storage spaces, such as a stand-alone hard-drive, a virtual hard-drive, or ROM and RAM memory. Additionally, the interface service 8 in the present embodiment communicates with each interface portal 6 via one or more interfaces 13, such as a local or remote network connection, realized by a wired or a wireless network. The use of a wireless network allows a portable device such as a personal digital assistant (PDA) to serve as an interface portal 6. When a Web browser is used as the interface portal 6, the Web browser, or appropriate plug-in, renders the output screens and the selected query parameters are sent to the interface service 8. To facilitate the rendering of the output screens, RIA (Rich Internet Applications) technologies can be used, such as Adobe Flash, Adobe Flex, Microsoft Silverlight, and Sun JavaFX. Further, the interface service 8 and the interface portal 6 can reside in a single device, such as a personal computer.

The interface service 8 in some embodiments uses the hosting device 10 to communicate with the database 4 (or in some cases, multiple databases). Communication between the interface service 8 and the database 4 can be facilitated by one of various communication methods, for example, a local or remote, wired or wireless network connection. Additionally, the interface service 8 and the interface portal 6 can reside on the same device as the database 4.

FIGS. 2-21 are various examples of output screen views that can be displayed on each exemplary user display 12 of FIG. 1, and illustrate one embodiment of a method for constructing a formulated structural query. In particular, FIGS. 2-16 illustrate the generation of a sample query, "Find files that contain a blinking caption," which can be used for finding data corresponding to graphical displays on an HMI device, for example. As discussed further below, a structural query requires an object-oriented formulation (regardless of its concrete visualization form) to be expressed using the user interface 12. With respect to the present sample query, it can be understood as follows. The "Find files" part of the sample query means that objects (instances) of the "File" class should be found, to be identified by the "fileName" property (attribute) of those objects. The "that contain" part of the sample query means that the "File" objects must contain the "blinking caption" component, i.e., there should be at least one object (instance) of the class "Caption", with the property (attribute) "blink" with assigned value "true" contained within the "File" object. Correspondingly, as will be described further below, FIG. 15 graphically illustrating this sample query can be understood as follows: "Find instances of type (class) "File" with property (attribute) "fileName", show values of "fileName" (via the variable "fileName_1" which is assigned to the literal associated with the "fileName" attribute) where the "File" object contains object of type (class) "Caption", where this object has property (attribute) "blink" with the value (literal) set to "true".

Figure 2:
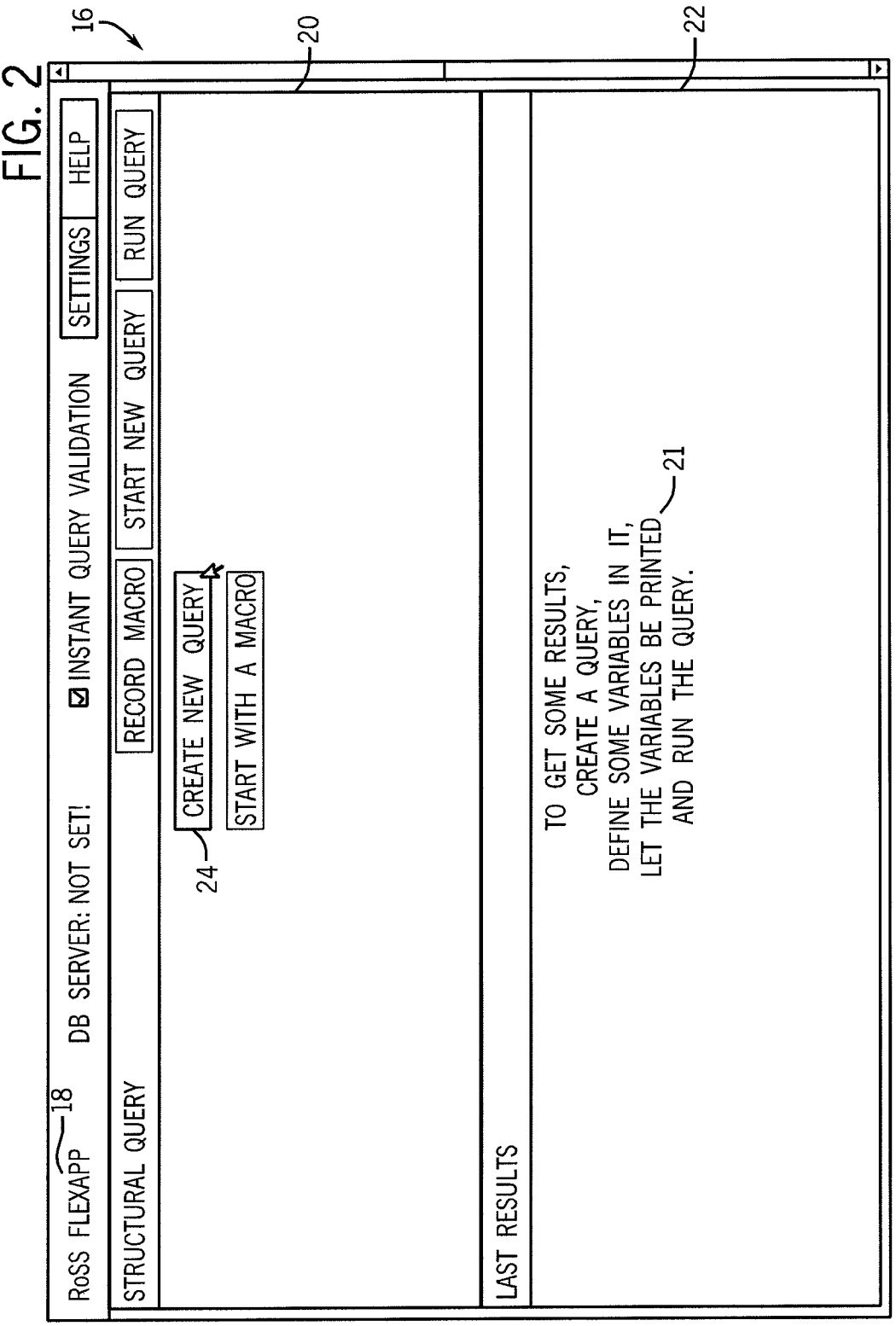

Referring to FIG. 2, to formulate a query including one or more query elements, an initial query screen 16 is provided on the user display 12 when the interface service 8 is initially accessed by the user 11. The initial query screen 16 includes a title section 18, a structural query section 20 ("Structural query"), which usually displays the formulated query, and a query results section 22 ("Last results"), which displays results from the database 4 of a prior query processed by service 8 which was run by the user. At other stages of the query building process, other dialogs can be displayed, which can be contained in the mentioned dialogs, or can overlay them. In one embodiment, the different sections, such as the structural query section 20 and the query results section 22, can be differentiated from one another, using standard textual information (caption/header), positional means, and also by using different colors on the screen.

As illustrated, because no query has yet been constructed, there are no results to display in the query result section 22. Instead an information section 21 is displayed, which functions as a brief guide for how to get some results. The structural query section 20 is configured to provide various user selectable boxes or buttons, which initiate various tasks when selected. For example, a "Create-new-query" button 24 is provided which when selected allows a user to begin constructing a new formulated query by inputting desired search parameters, including desired concrete or special identifiers, and any structural relations between this and any additional query elements.

Figure 3:
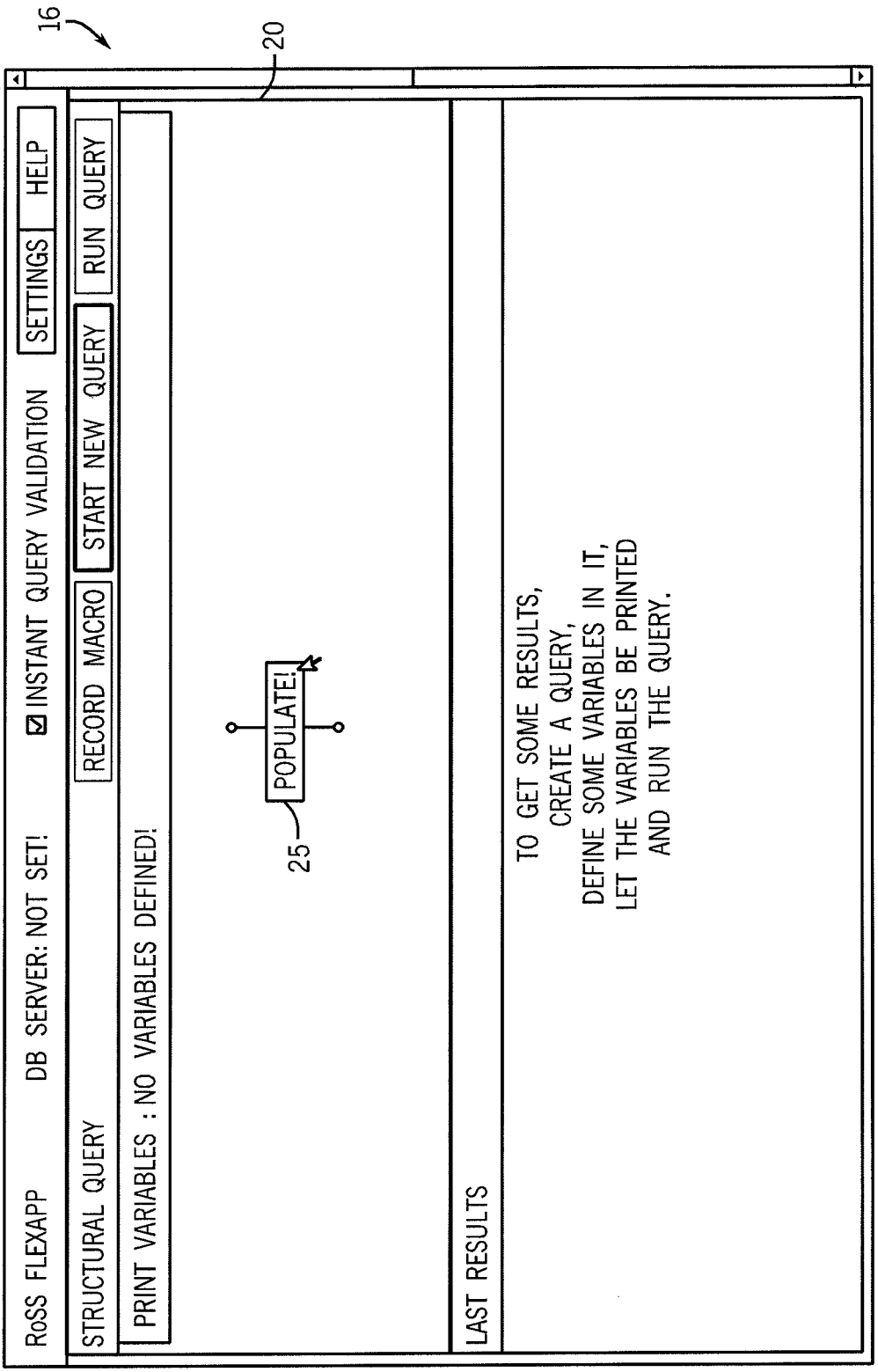
Figure 4:
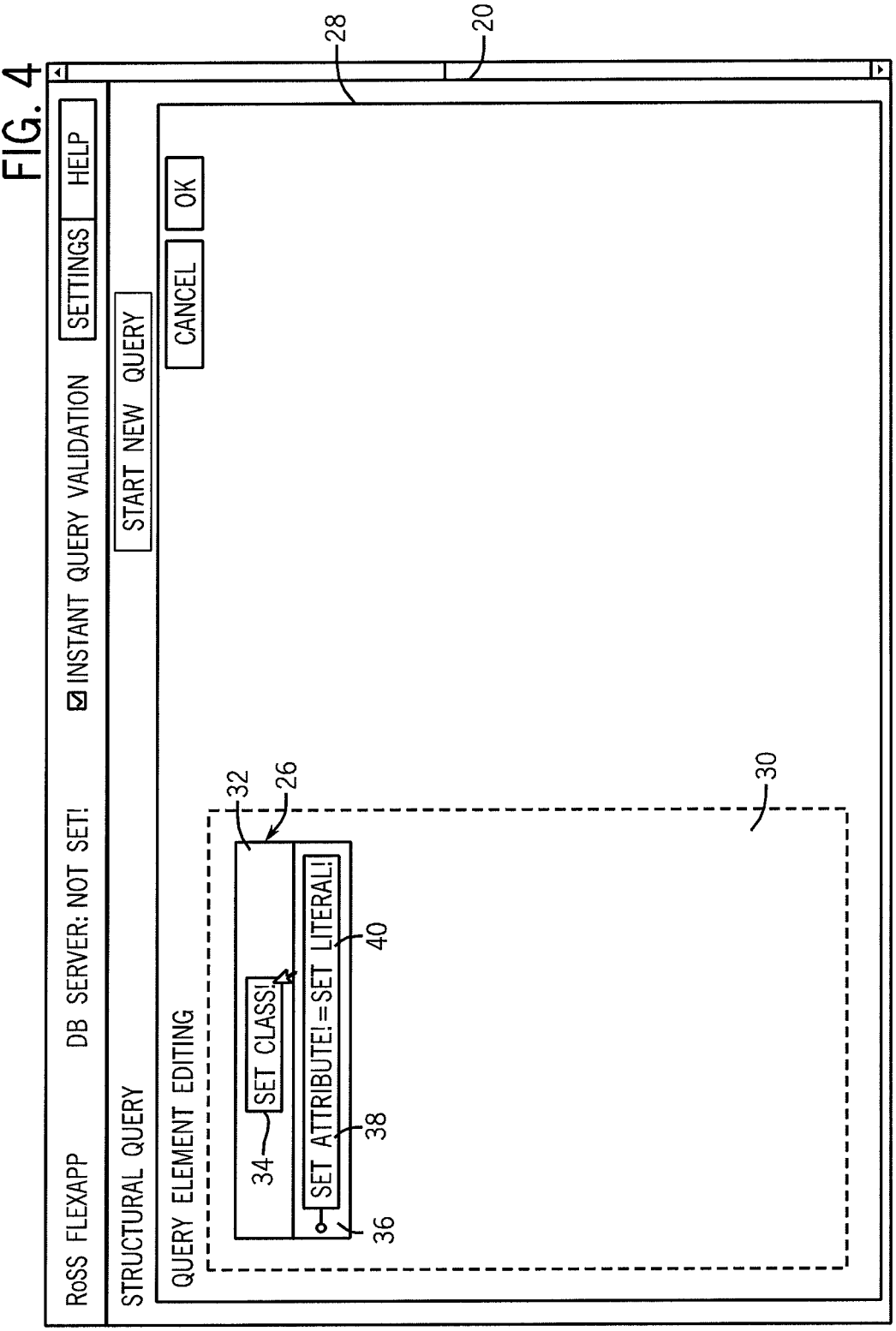

For example, once a user selects the "Create-new-query" button 24, the structural query section 20 becomes modified as shown in FIG. 3. In particular, the structural query section 20 in screen 16 can provide a graphical view of the formulated query as it is being generated by the user 11. A formulated query can contain one or more query elements, whose content and relations can be specified to define the query. The structural query section 20 initially shows an empty query element prompting for population. A query element can be populated by selecting its action-enabled area 25 and entering for example an "Edit" command, which can be selected from a pop-up menu (not shown). As shown in FIG. 4, a query element 26 is edited in a query element editing screen 28, which displays the query element 26 in more detail and provides editing functionality.

Further with respect to FIG. 4, the query element editing screen 28 is provided as an overlay to the query screen 16, and includes a query element section 30 that encloses the query element 26. The query element 26 provides one or more query element portions to be populated which each can correspond to one or more of classes, attributes, and literals. In the particular example illustrated, the query element 26 initially contains a first designation area 32 having a selectable and action enabled "Set-class!" prompt 34 and a second designation area 36 that includes a "Set-attribute!" prompt 38 and a "Set-literal!" prompt 40, both of which are selectable and action-enabled.

Figure 5:
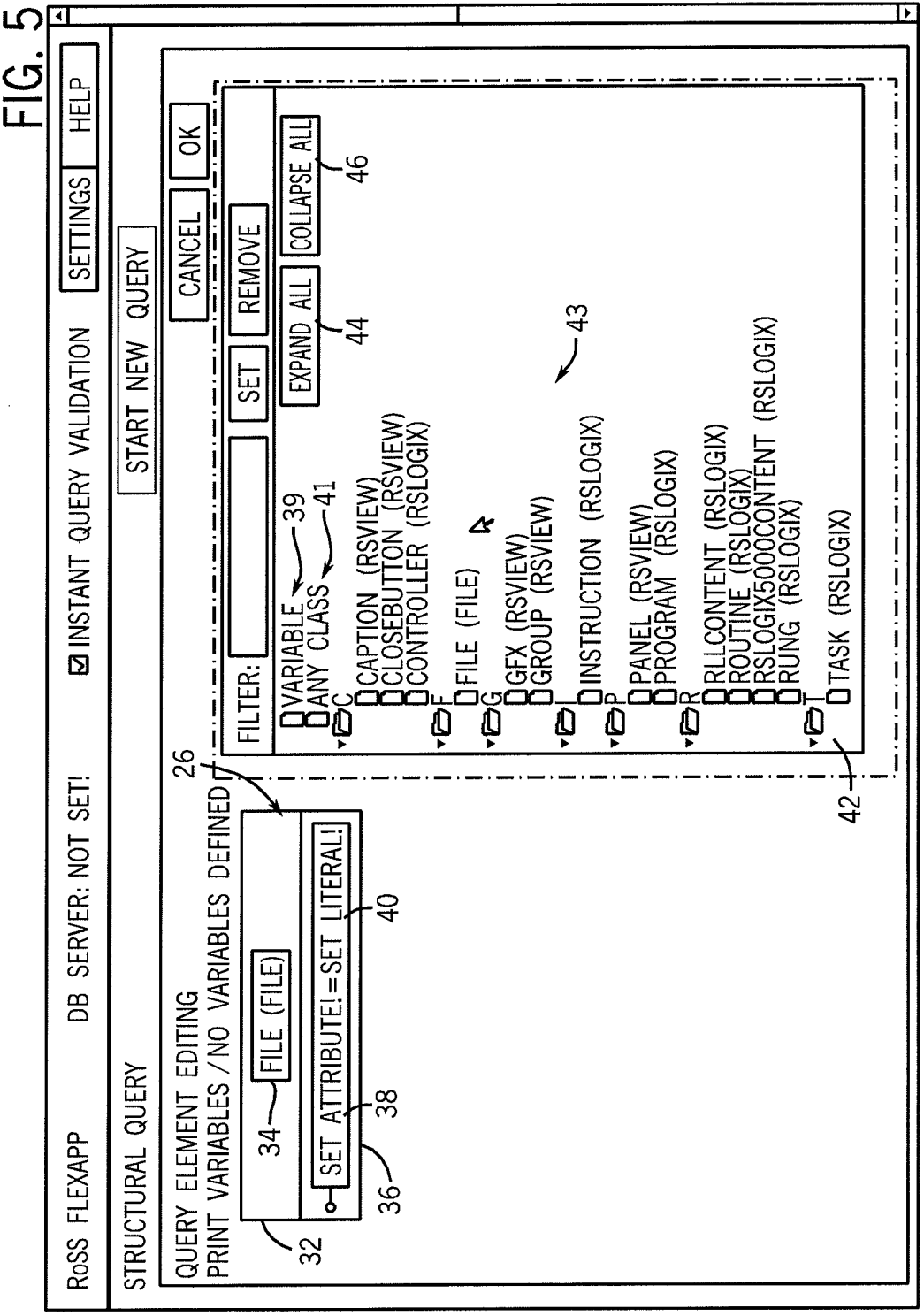

Once a user selects one of the action-enabled areas, such as the "Set-class!" prompt 34, and selects for example an "Edit" option from a pop-up menu, an output screen having an offer section 42 is displayed, one example of which is shown in FIG. 5. The offer section 42 generally can provide a list 43 which includes possible concrete and special identifiers which can be assigned to a particular query element portion. The concrete identifiers in the list 43 can reflect the actual data in the structured database 4 and can be generated as a result of an "explorative" query which is run for this purpose. The concrete identifiers in the list 43 can also reflect any possible data which can be in the database 4. In this case, the concrete identifiers come from the definition of the object model structure corresponding to the data stored in the database 4. A stored list of the possible classes or attributes can be accessed and displayed as part of list 43 and the structural database 4 doesn't have to be queried.

In addition to the concrete identifiers which can be selected, the list 43 of offer section 42 can also include special identifiers which can be selected. These two displayed special identifiers operate as "wild-cards" in a query element portion and include a "VARIABLE" item 39 and an "ANY CLASS" item 41 for classes (or an "ANY ATTRIBUTE" item for attributes, etc.). The "ANY CLASS" item 41 is a substitute for all possible class identifiers and is used as a wild-card to express that the user doesn't care what the concrete identifier is for the corresponding query element class portion. The "VARIABLE" item 39 serves to mark the query element portion as a "place of interest". This means that the user wants to obtain identifiers (in case of classes and attributes, or literal values in case of literals) as a query result.

As shown in FIG. 5, for example, selection of the "Set-class!" prompt 34 results in the displaying of the list 43 in the offer section 42 of all the specific possible classes corresponding to data in the database 4 which are suitable for that particular class portion of the query element 26, in this case, the first designation area 32. The identified classes are depicted in alphabetical order, although other organizational configurations can be used, such as organizing by domain (e.g. RSView, file, RSLogix, see FIG. 5), database location, etc. To populate the first designation area 32, the user can select one of the concrete classes identified in list 43 or one of the special identifiers "VARIABLE" item 39 or "ANY CLASS" item 41. The selection can be entered in a variety of ways depending upon the embodiment including, for example, by moving a cursor to a desired item via a mouse and clicking on that item. If the user selects the "VARIABLE" item 39, the user can be prompted to enter a variable name, which then serves to identify items related to that variable in the query results section. If the user selects the "ANY CLASS" item 41, the formulated query will not be limited by any specific class. As shown in FIG. 5, if the user selects the specific class "File" from the offer section 42, that selected class is then displayed in the first designation area 32 within the action enabled area corresponding to prompt 34.

Further, the offer section 42 additionally provides an "Expand-all" button 44 and a "Collapse-all" button 46 for providing a lesser or greater organizational view of the displayed items for selection. This functionality concerns the items within the organized structure (class names, attribute names, literal values), which are displayed as a tree-view in list 43. Items displayed outside the organized structure, e.g., the special values, are not affected by these buttons. By providing a list of identified classes (or attributes or literals) for the user 11 to preview, the user can be assured that a specific class (or attribute or literals) exists in the structured database 4, and the user need not be familiar with the particular nomenclature used for data in the structured databases 4. In the case of using the structure (object model) definition for query building, identifiers are displayed only for classes and attributes, which play a role in this structure, while literal values, for example strings, dates or numbers, are not displayed but have to be entered manually. In this manner, the user doesn't have to be familiar with the specific names of classes and attributes, with a hierarchical structure of the classes, and with the competence of attributes to individual classes, but has to be aware how to correctly formulate a literal value of appropriate data type, e.g. the correct format for specifying a date. Generally, providing an offered list of identifiers based on object model structure definition reduces exploratory query searches, but doesn't ensure the overall correctness of the query, but only of its structure format.

Further referring to FIG. 5, the user can further populate the formulated query by inputting items in the second designation area 36. As previously discussed, the second designation area 36 contains the "Set-attribute!" prompt 38 and the "Set-literal!" prompt 40. Similar to the operation of the first designation area 32, the "Set-attribute!" prompt 38 can be selected to produce a comprehensive list of selectable concrete attribute identifiers (i.e., all the possible specific items available for attributes) in the offer section 42. Also, the "Set-literal!" prompt 40 can be selected to produce a comprehensive list of selectable concrete literals in the offer section 42.

Figure 6:
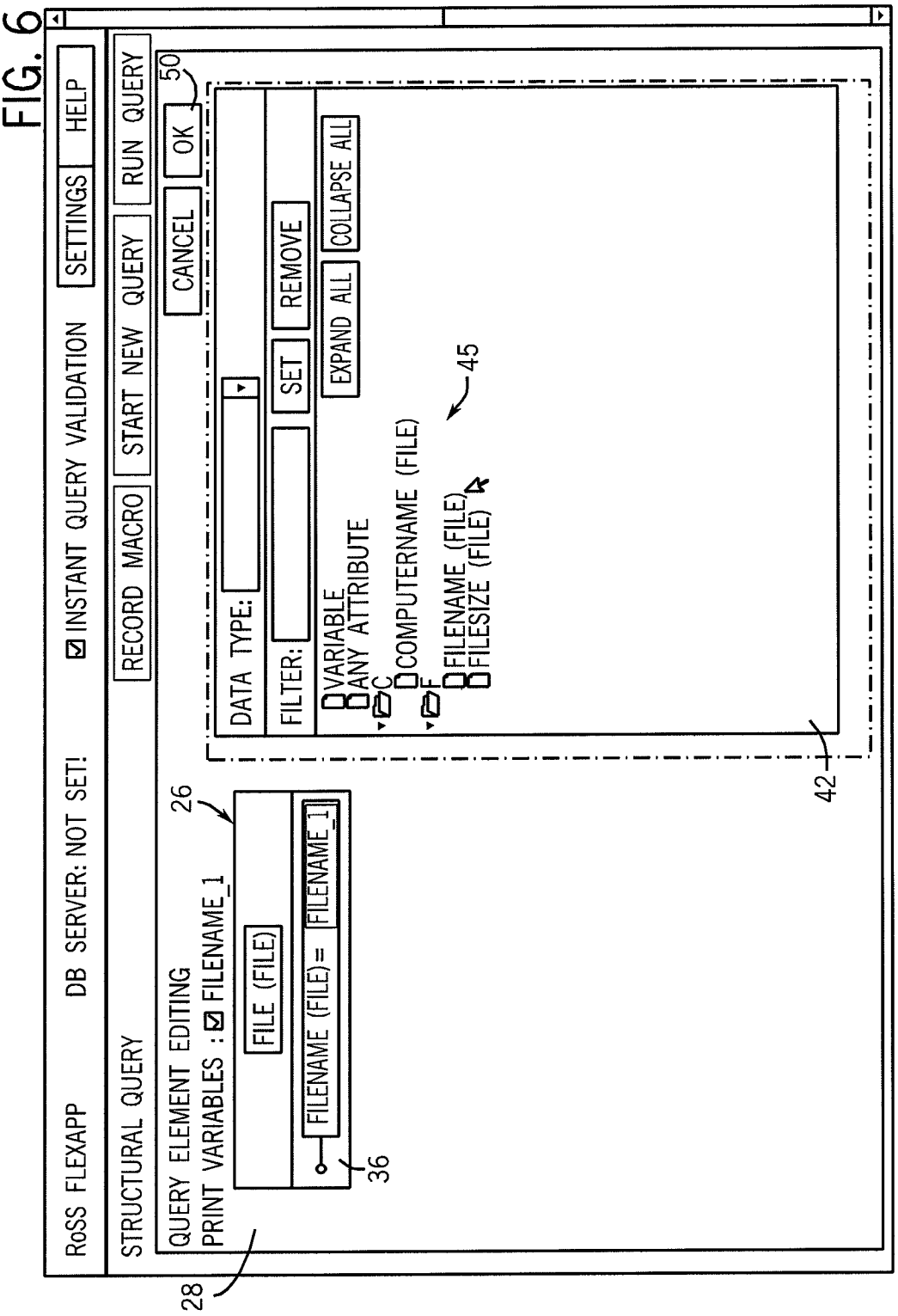

Referring to FIG. 6, an exemplary view of the offer section 42 is provided in which a list 45 of selectable attributes is displayed, as would occur following a user's selection of an "Edit" option from for example a pop-up menu following selection of the "Set-attribute!" prompt 38 in FIG. 5. FIG. 6 also shows the second designation area 36 as it would appear after the attribute "fileName" is selected from the list 45 in the offer section 42. Alternatively, the user can select another one of the attributes of the list 45 or the "ANY ATTRIBUTE" item from the list, in which case the formulated query would not be further limited by any specific attribute. If the user selects the "VARIABLE" item and enters a variable name in appropriate dialog, the names of attributes of the "File" class will be displayed as results when a structural query is run. When a user selects an attribute (concrete attribute identifier or special identifier), a variable name is automatically generated for the literal associated with that attribute (i.e. value of the attribute). For example, as shown, when the attribute "file-Name" is selected, the variable name "fileName_1" is provided in the second designation area 36. The user can leave that variable name for the literal (it is equivalent to a user's selection of the "VARIABLE" item from literal values offer and setting "fileName_1" as variable name manually) or can select or enter a concrete value for the literal.

Figure 7:
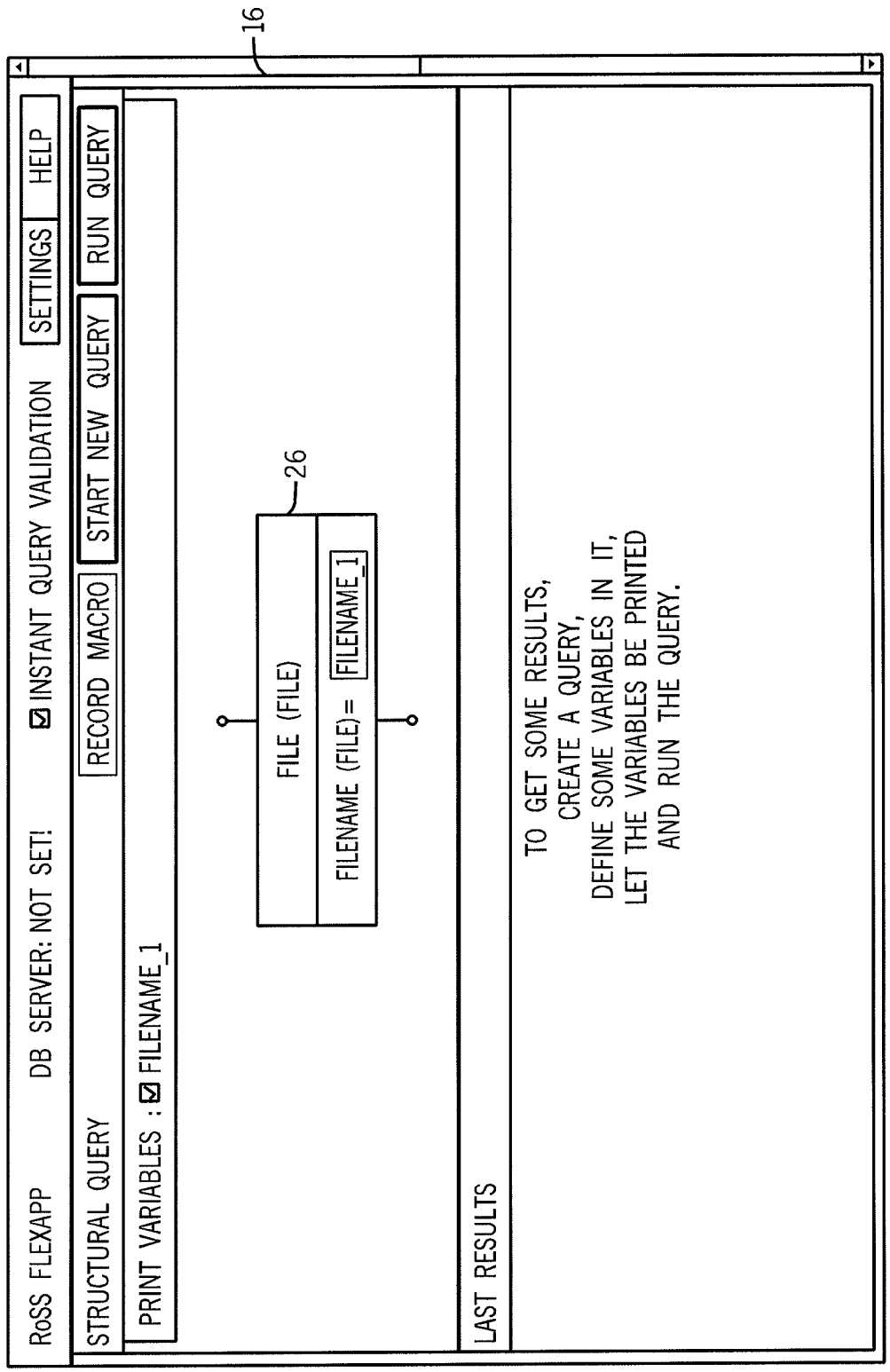

In addition, as discussed below, the literal value is related to the attribute identifier by a mathematical relationship, which in the illustrated embodiment is an equals relation ("="). Once a user is finished populating the query element 26, confirmation of this can be provided, such as by selecting an "OK" button 50 on the query element editing screen 28. Completion of the query element 26 closes the query element editing screen 28 and the query element 26 is displayed in the query screen 16 as shown in FIG. 7.

Figure 8:
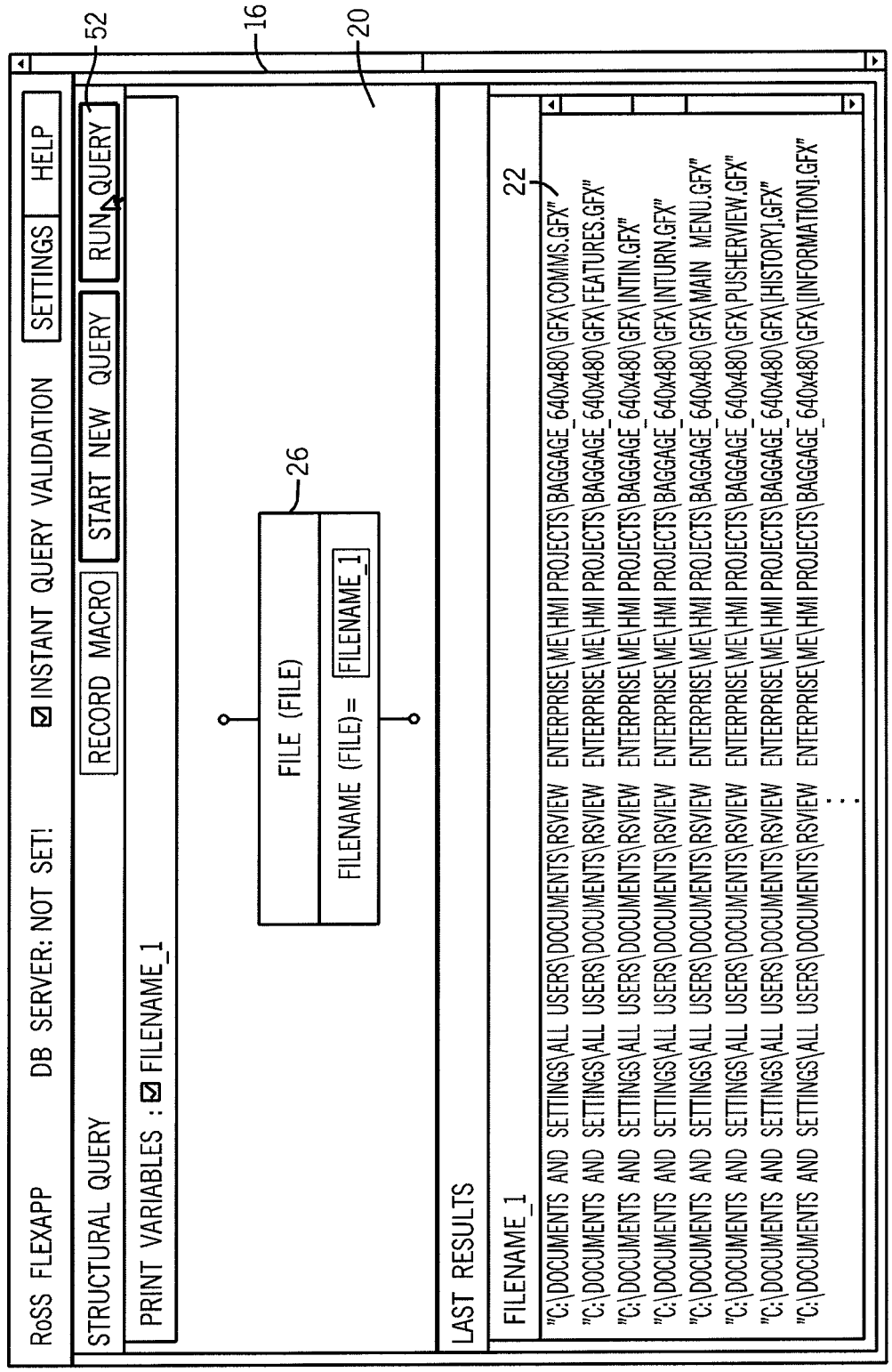

Turning to FIG. 8, once a query element 26 has been populated in the structural query section 20 and it contains one or more variables, i.e. identification of places of interest in the query, values relevant to which the user wants to find in the structural database, a formulated query can be executed, for example, by selecting a "Run-query" button 52. The results of the formulated query are then displayed in the query results section 22. Running a formulated query with the items in the illustrated query element 26 produces a list of all items (in the illustrated case names of files), which are relevant for the specified variables in the query. Because there are no other constraints defined, this list displays names of all files corresponding to the data stored in the database 4. This query example (containing just one query element 26) is defined rather broadly, so a significant number of resultant files can be returned, although the possible query results are limited by the size and content of the database 4. For other queries, the number of results can be lesser or greater in extent. Also in the present example, the query element 26 is populated to define desired results: namely, literal values related to the "fileName" attribute of instances of the "File" class. To further narrow the search, a user can add additional query elements in association with the query element 26 as discussed with reference to FIG. 9.

Figure 9:
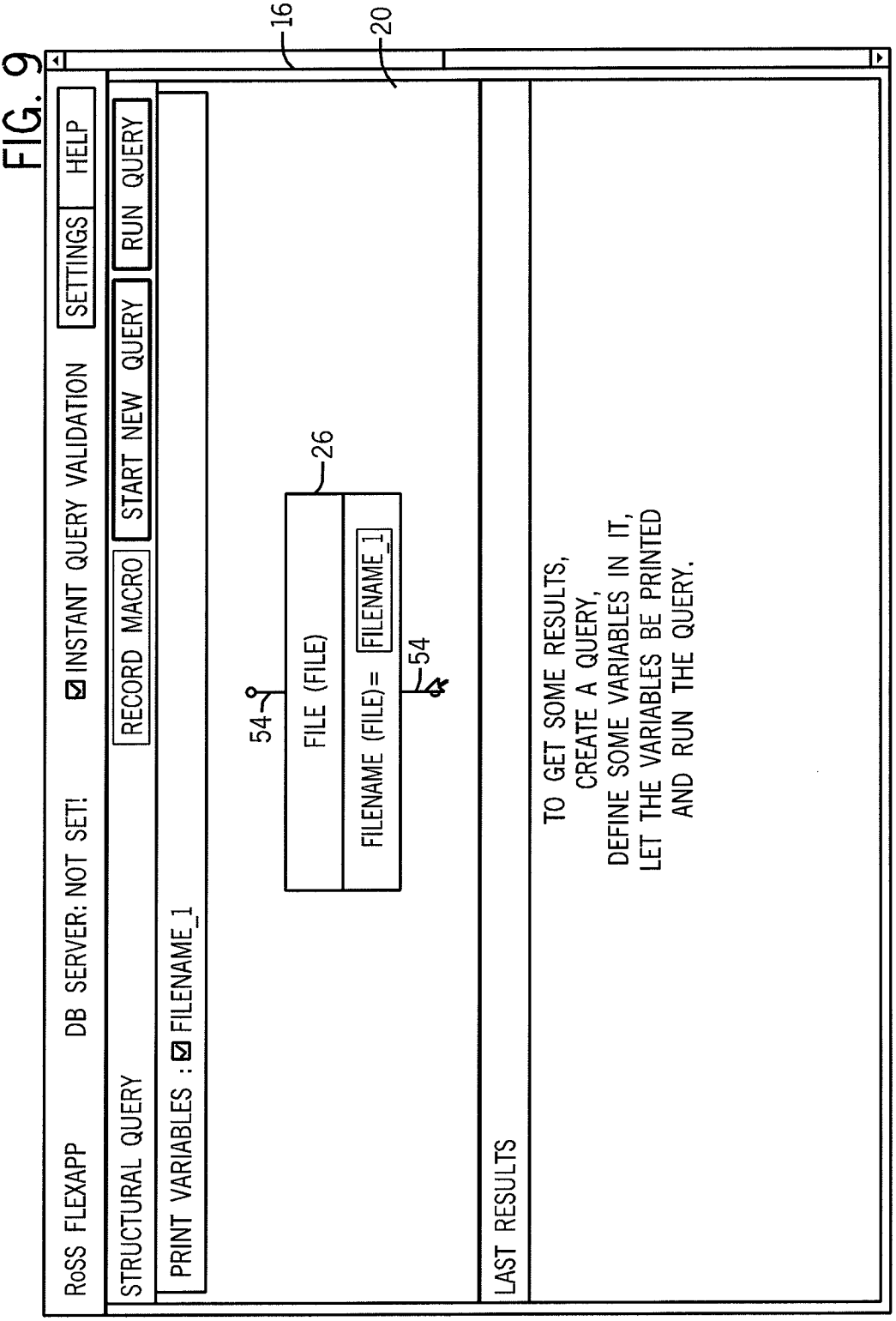

Referring to FIG. 9, the query element 26 can in at least some circumstances operate in association with one or more element connectors 54 (in this example, two are shown). The element connectors 54 are used to create structural and logical hierarchical relationships between the query element 26 and one or more additional query elements. One such structural relationship is a "contains" relation. For example, an element connector 54 extending from the top of the query element 26 can place the query element 26 in a subordinate position to another query element (or elements) on top, requiring the query element 26 to be contained within that top query element, whereas an element connector 54 extending from the bottom of the query element 26 can place the query element 26 in a superior position relative to another query element (or elements) on the bottom, requiring any such bottom query element to be contained within query element 26.

Figure 10:
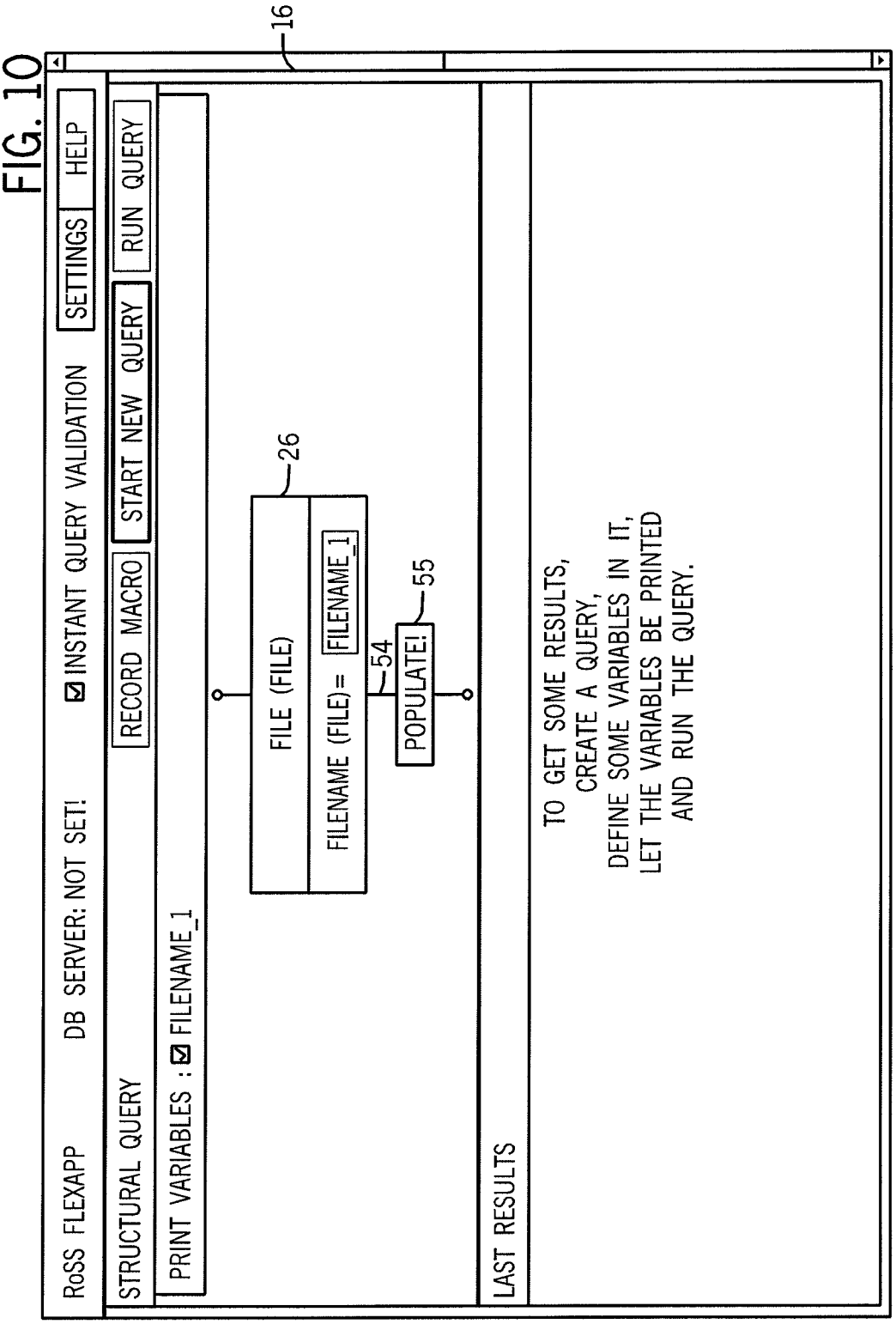

To add an additional query element in association with the existing query element 26, the user selects one of the element connectors 54 extending from the query element 26. For example, selecting the lower element connector 54 of FIG. 9 and selecting a "Contains" option from the pop-up menu that appears in turn produces an action-enabled prompt 55, as shown in FIG. 10, which corresponds to a new empty inferior query element.

Figure 11:
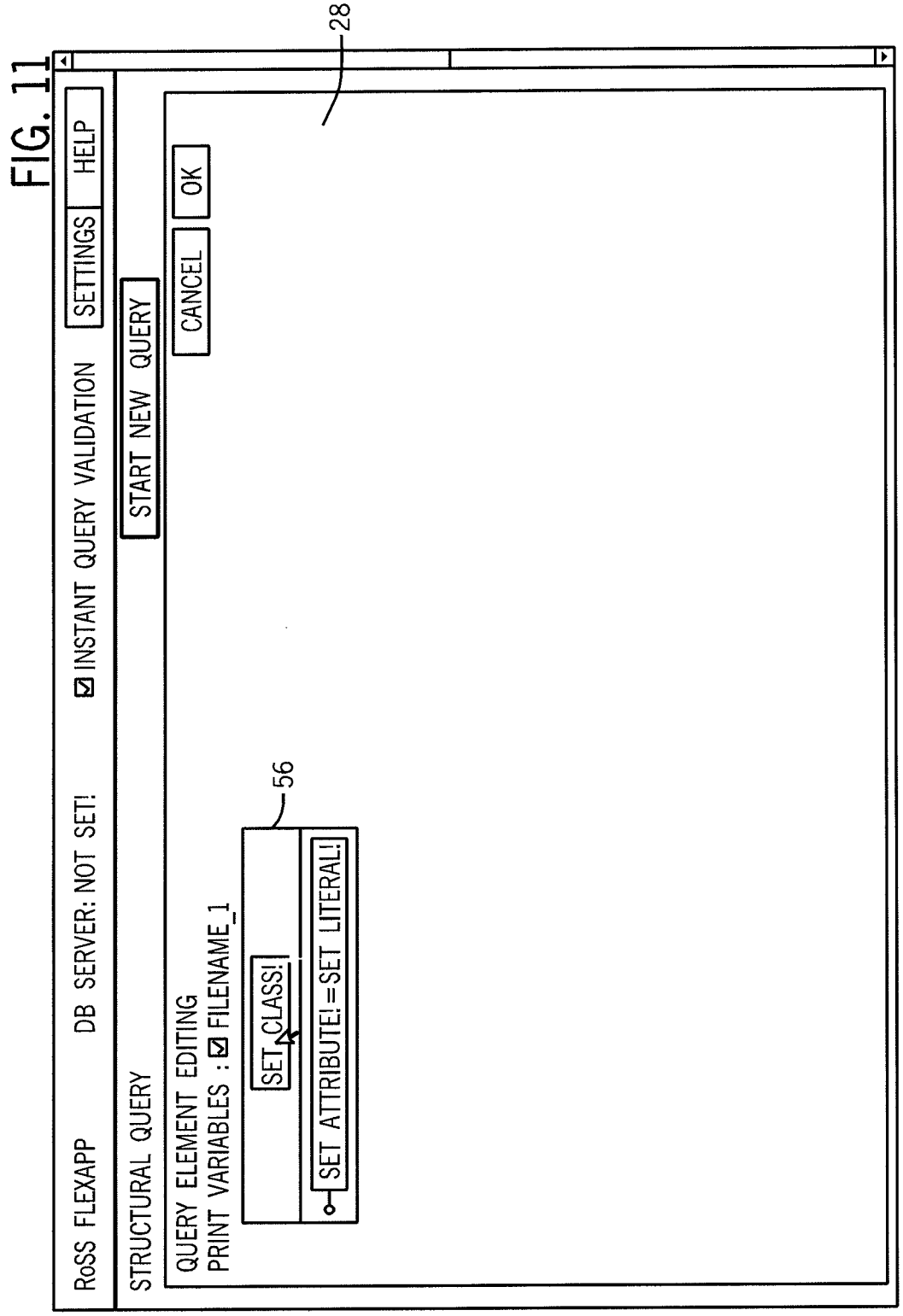

Further, selecting the prompt 55 and picking for example an "Edit" option from its pop-up menu results in the query element editing screen 28 again being displayed; now containing the new query element 56, as shown in FIG. 11. The designation areas of the new query element 56, which are the same as those associated with the query element 26 (e.g., designation areas 32, 36), can then be filled.

Figure 12:
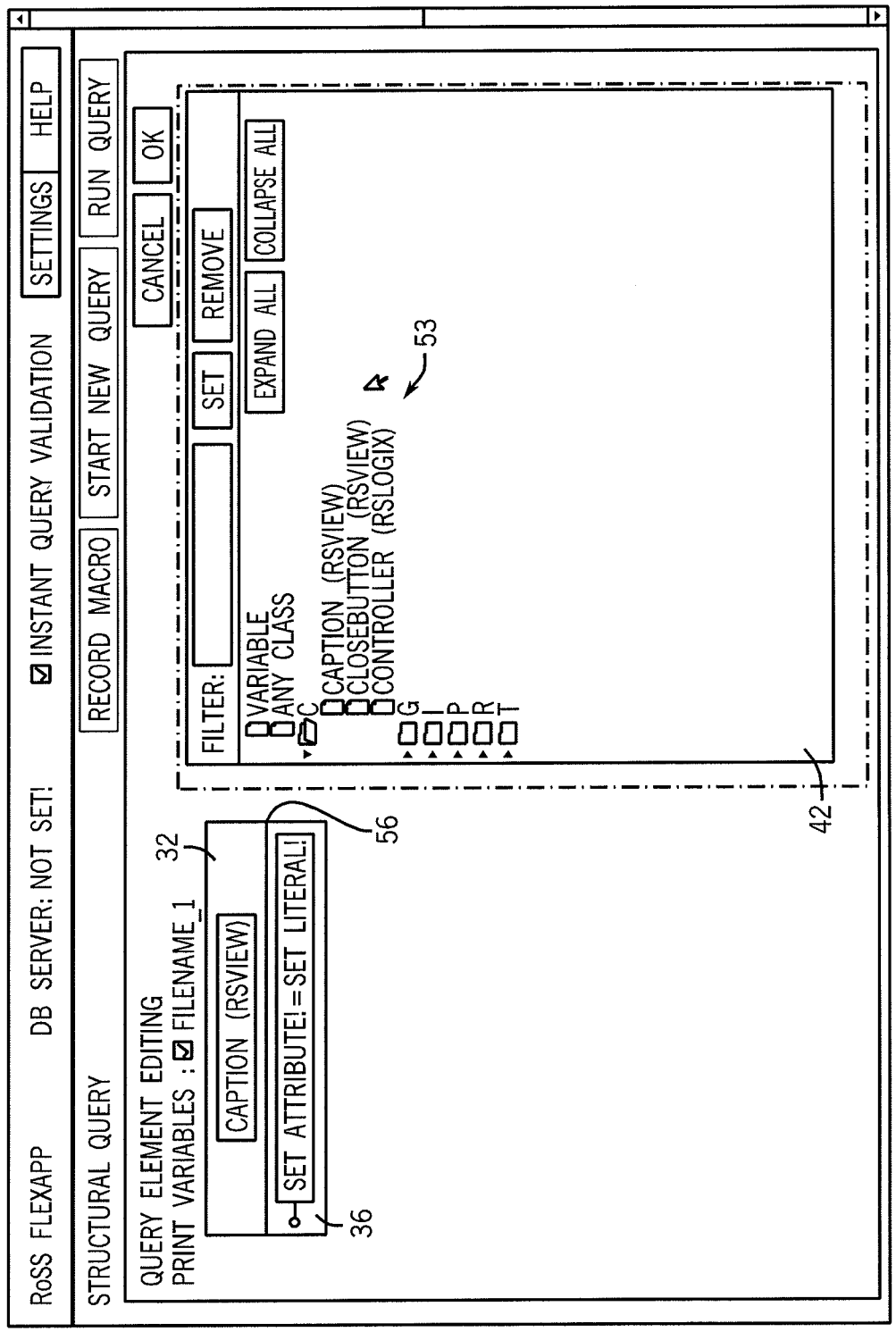

In particular, as shown in FIG. 12, the first designation area 32 of the additional query element 56 is populated by selecting its corresponding prompt so as to bring up the offer section 42 reflecting a class list 53, and then selecting the class "Caption" from the offer section 42. The offer of identifiers for the edited class respects the already defined constraints in the query, so only classes that can be contained within the "File" class are offered. Again, the list 53 comes either from an explorative query of the database 4, or it is deduced from the definition of the data object model structure.

Figure 13:
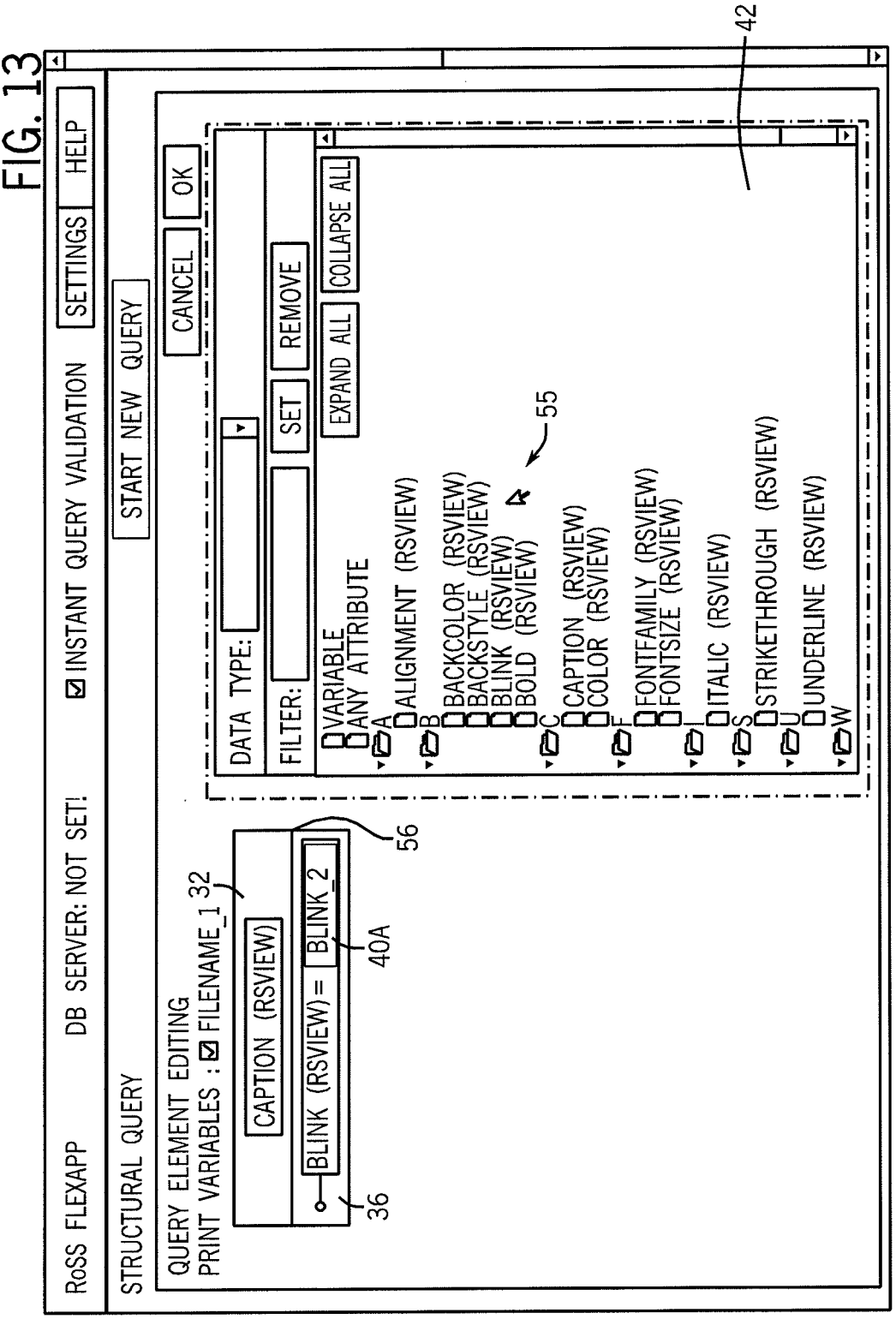
Figure 14:
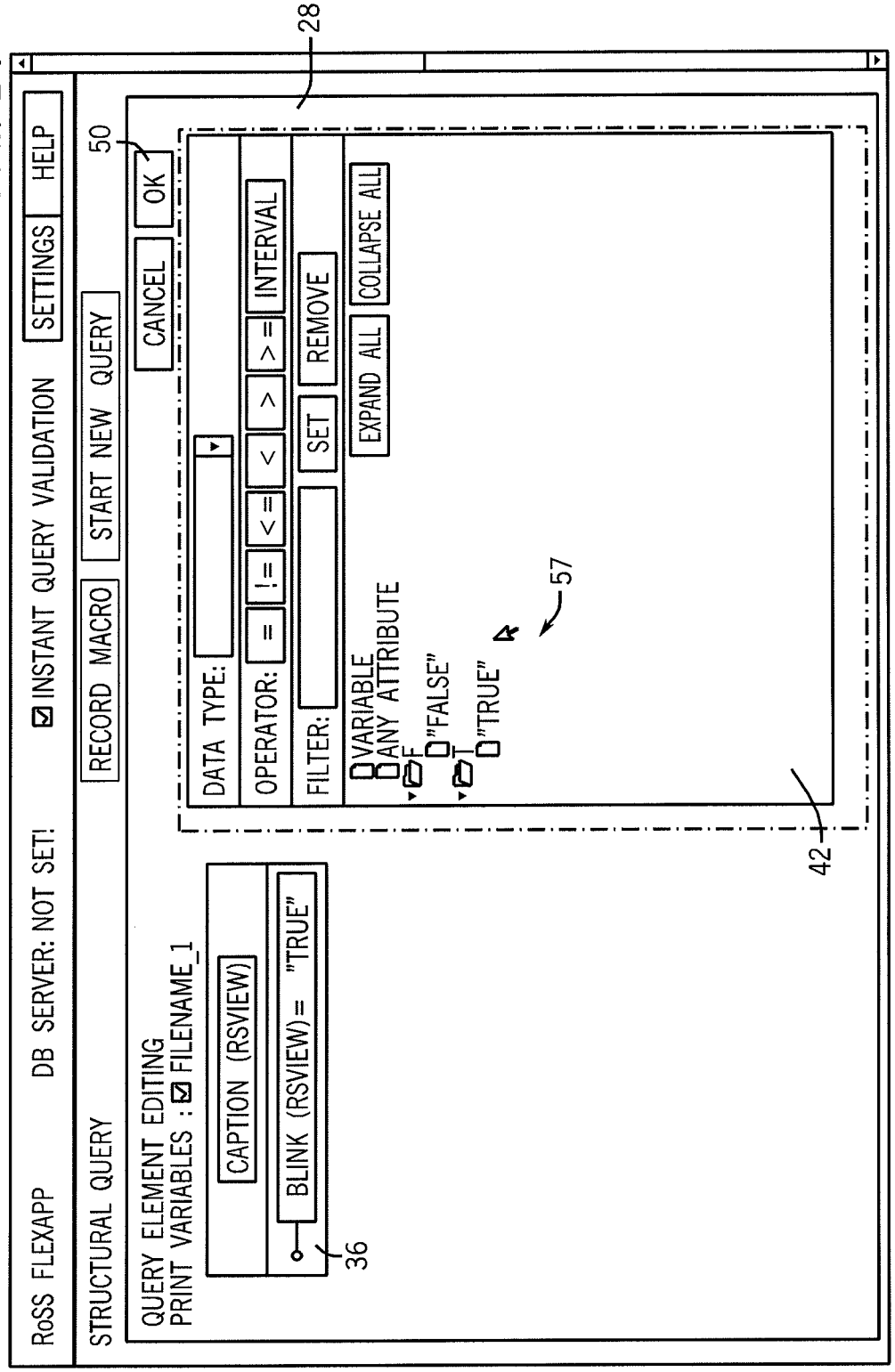

As shown in FIG. 13, the attribute of the second designation area 36 of query element 56 is populated by selecting the corresponding prompt so as to bring up the offer section 42 reflecting an attribute list 55, and then selecting the attribute "Blink," from the offer section 42. As discussed above, when a specific or concrete attribute identifier is selected, an associated literal variable name is automatically assigned. In the present example, the variable name "Blink_2" is assigned. If the user then selects the action-enabled area of the literal 40 surrounding this variable name and picks an "Edit" option from its pop-up menu, the offer section 42 provides a list 57 of concrete literal values available in the database 4, as shown in FIG. 14.

The user can then select a specific literal from the items in the offered list 57. For example, if the user selects "true" from the offered list 57, this item is then provided as a specific literal in the second designation area 36.

Figure 15:
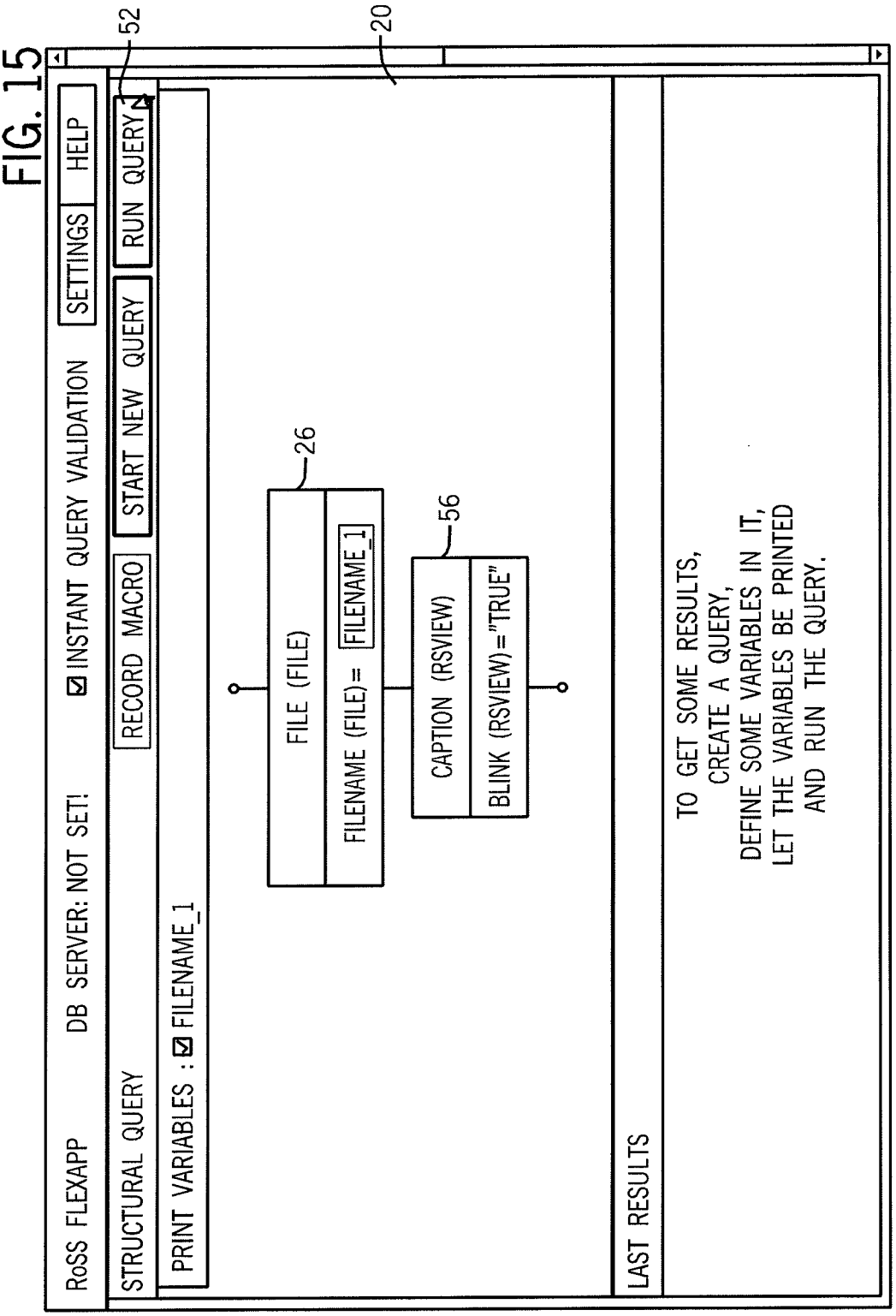
Figure 16:
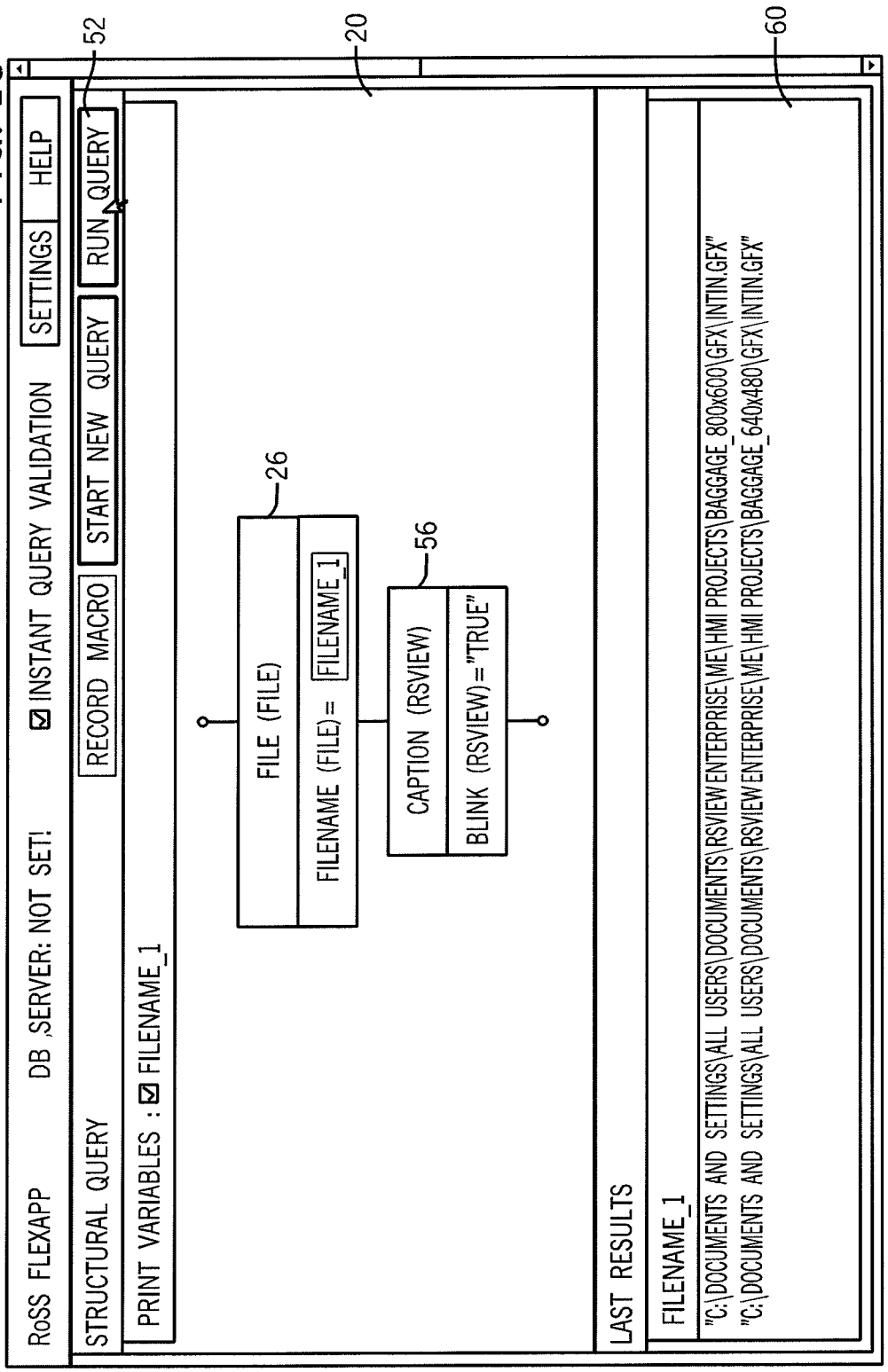

After the user selects the "OK" button 50, the query element editing screen 28 closes and the structural query section 20 displays the updated formulated query as shown in FIG. 15. As shown, the updated formulated query graphically displayed in the structural query section 20 particularly includes the query elements 26, 56 and their interrelationship. Based on the illustrated populated query elements 26, 56 in structural query section 20, the formulated query provides for all "Files" having an attribute of "fileName", where the "File" further includes a "Caption" having an attribute of "Blink" and the literal value of the "Blink" attribute equals "true", providing the names of such files, i.e. the literals of the "fileName" attribute. The user can run the updated formulated query by selecting the "Run-query" button 52, and the query results section 60 displays the results of the execution of the updated formulated query, as shown in FIG. 16, wherein the results display names of files relevant for the defined variable "fileName_1" with respect to the constraints defined in the query.

Figure 17:
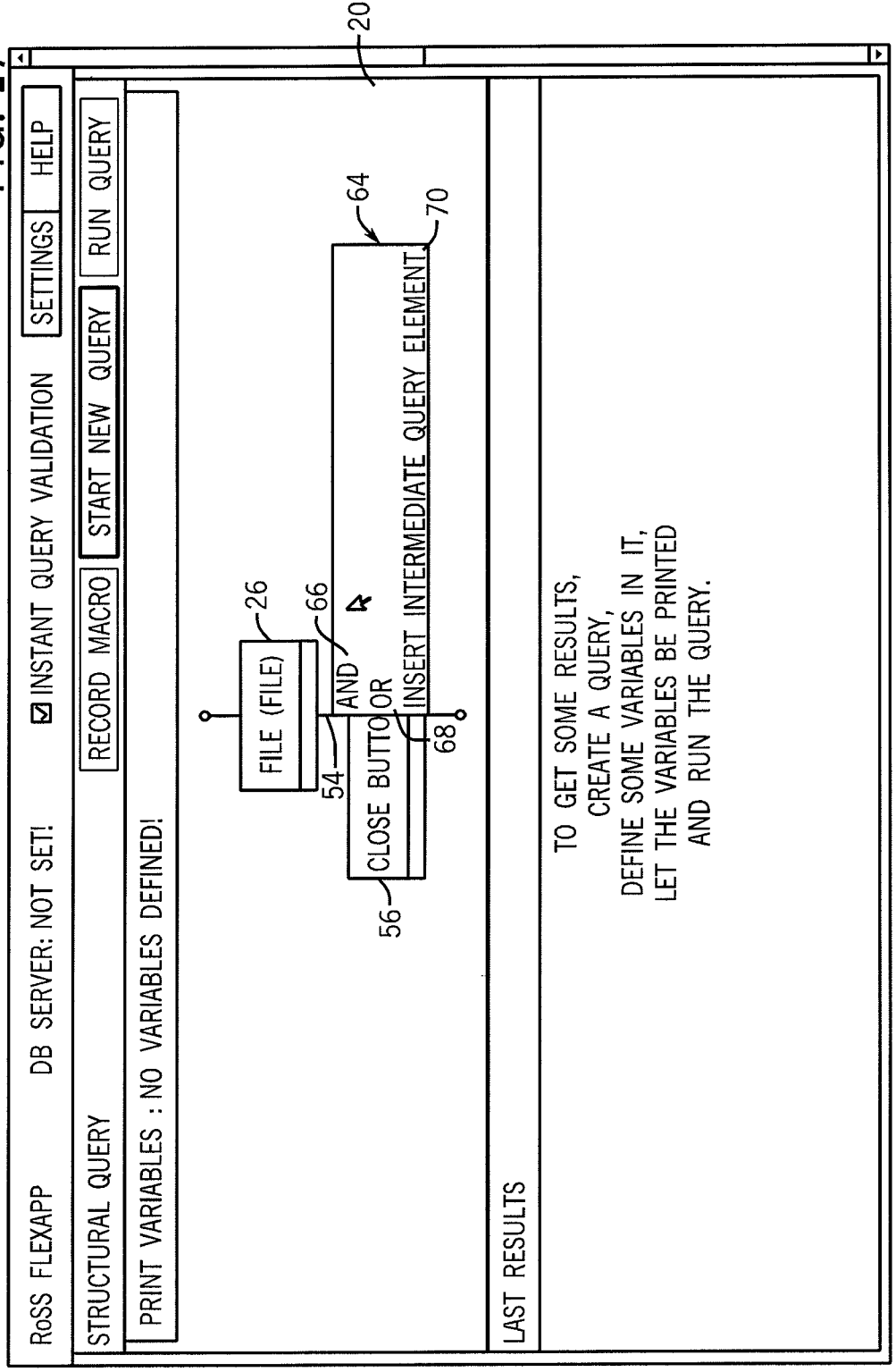
Figure 18:
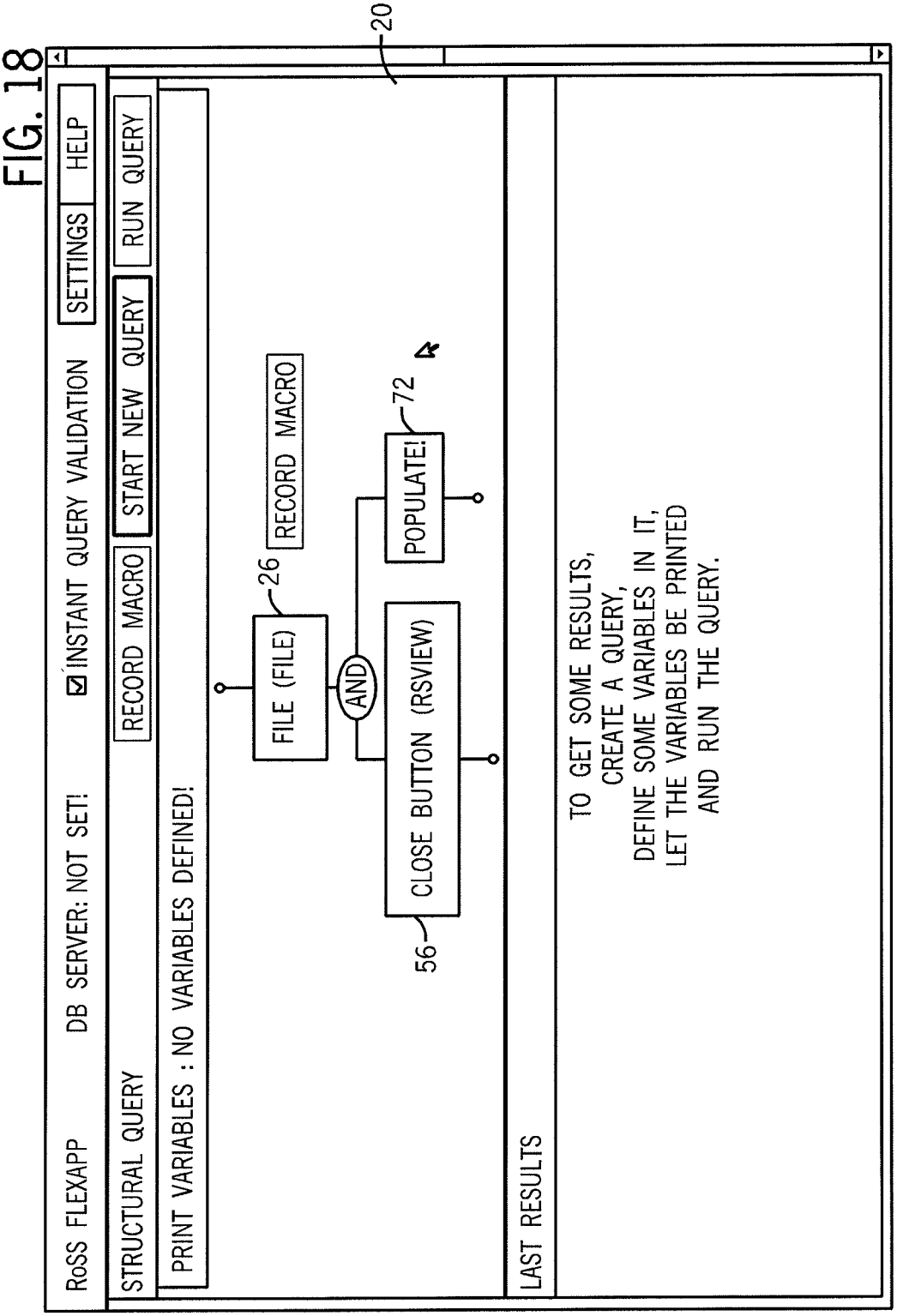

As discussed above, in this example, the hierarchical position of a given query element depends on whether it is placed above or below another query element 26. A user can also insert a new query element between two already existing query elements, (e.g., between query elements 26, 56) by selecting the element connector 54 situated between them. Further, as shown in FIG. 17, selecting the intermediate element connector 54 provides other options for defining relationships between query elements. In particular, relationships between query elements can also be represented using logical "AND" and logical "OR" operators (and possibly also other suitable operators) in addition to the structural relationship (e.g. "contains" relation) between two or more query elements. In this regard, selecting the intermediate element connector 54 brings up a pop-up menu 64 having an "AND" item 66, an "OR" item 68 and an "Insert-intermediate-query-element" item 70. When selected, the "Insert-intermediate-query-element" item 70 allows the user to merely insert an intermediate query element (not shown in FIG. 17) subordinated to the query element 26 above and superior to the query element 56 below. Alternatively, when a user selects "AND" item 66 or "OR" item 68 from the pop-up menu of the element connector 54, a new empty query element can be created as a sibling to the original query element from whose top the element connector extends. In this case, the "AND" item 66 is selected, creating a new query element which is initially denoted by its action-enabled prompt 72 as shown in FIG. 18 and which is a sibling to the query element 56.

The new query element (initially denoted by "Populate!" prompt 72) that is created is in a logical "AND" relationship with the query element 56. This new empty query element together with query element 56, is in a subordinate relationship to the query element 26, and it can then be populated as desired, but with respect to the already defined constraints.

In addition to the various options for adding and interconnecting query elements, the query element portions can be interconnected using logical operators too. For example, referring to FIGS. 19A-19D, additional pairs of attributes and literals can be added to a single query element, such as the illustrated query element 26. For example, when the query element 26 (FIG. 19A) is in the query element editing screen 28, the user can select an attribute-literal pair connector 74 in the second designation area 36 to display a logical operator selection pop-up menu 76 that includes an "AND" item 78 and an "OR" item 80, which represent logical "AND" and logical "OR" operators, respectively (FIG. 19B). Similar to above, other suitable logical operators, such as "XOR" ("eXclusive OR"), can also be used. Once a logical operator has been selected, such as by selecting the "AND" item 78 (FIG. 19C), an additional designation area, which in this example is a new empty attribute-literal pair 82, displaying prompts "Set-attribute!" and "Set-literal!", is added to the query element 26 for defining a second attribute-literal pair (FIG. 19D). The new attribute-literal pair 82 has the previously selected logical relationship (e.g. "AND") to the already defined attribute-literal pair.

Figure 20B:
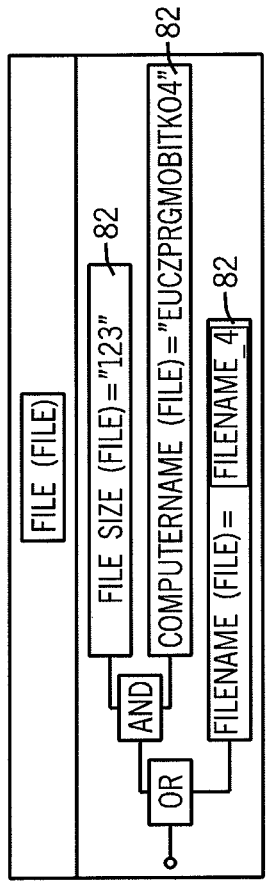
Figure 20A:
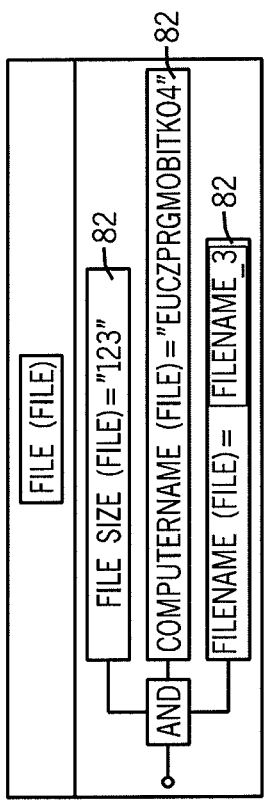
Figure 20C:
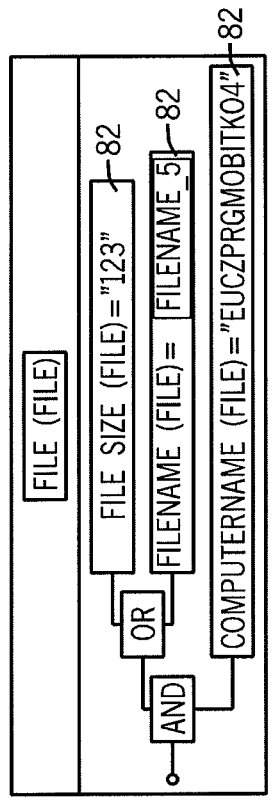

Further, as shown in FIGS. 20A-20C, a query element can include various combinations of query element portions such as multiple attribute-literal pairs 82 that can be combined using one or more logical operators (logical "AND" and/or logical "OR") to define various relationships. In addition, multiple logical subordinate and superior relationships can be established among the attribute-literal pair portions 82 of a given query element. For example, FIG. 20A depicts three attribute-literal pair portions 82 connected in a logical "AND" relationship. Also for example, FIG. 20B depicts two attribute-literal pair portions 82 in a logical "AND" relationship, where the logical "AND" relationship is in a logical "OR" relationship with still another attribute-literal pair portion 82. Further for example, FIG. 20C depicts two attribute-literal pair portions 82 in a logical "OR" relationship, wherein the logical "OR" relationship is in a logical "AND" relationship with yet another attribute-literal pair portion 82.

Figure 21:
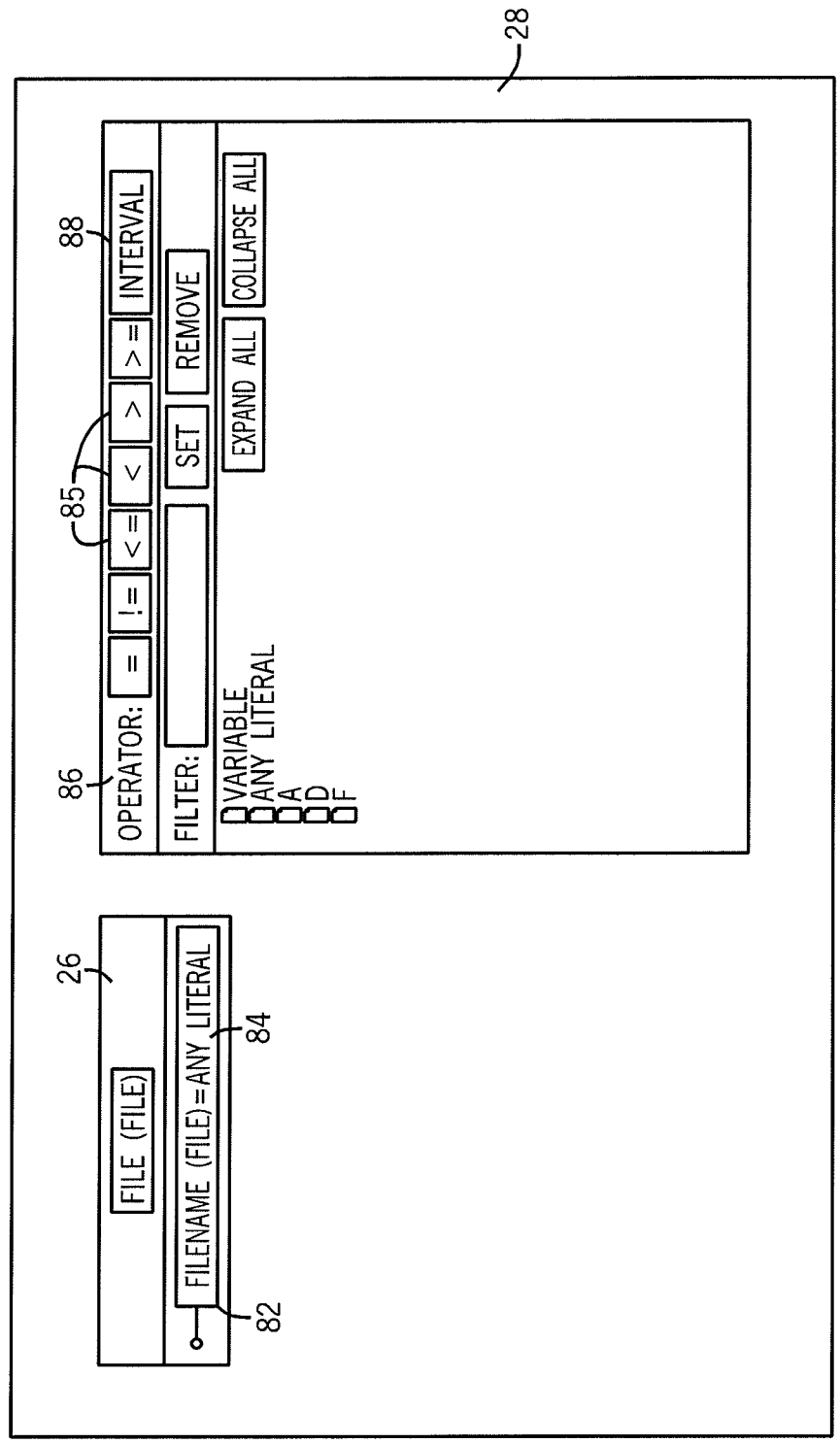

In addition to providing numerous combinations of attribute-literal pair portions 82, the attribute-literal pair portions 82 themselves can be further modified. As seen in FIG. 21, the attribute-literal pair portion 82 includes a mathematical operator 84 that defines the relationship between the attribute item and the literal item. As shown, a default mathematical operator such as equals ("=") is often used. However, in at least some embodiments, the default operator can be replaced by another mathematical operator, for example, "≠", "<", ">", "≤", "≥", etc. In some such embodiments, to achieve such replacements, the query element editing screen 28 includes an operator bar 86 having various mathematical operators buttons 85 to select (depending on data type of values relevant to the appropriate attribute). When editing the literal of the attribute-literal pair portion 82, a user is able to select a desired mathematical operator button 85 from the operator bar 86 to replace the current equals sign (or other default or previously selected operator). Additionally, the operator bar 86 can include still other options, for example an "Interval" button 88 that allows the user to specify an interval of allowed values for the appropriate literal. Depending on the data type of the values, it is also possible to use for example a "One-of-a-set" operator, or a "None-of-a-set" operator, which can replace a series of attribute-literal pairs connected with one or more "OR" operators, or one or more "AND" operators in a more effective way. Another possibility, suitable for string values, is a "Substring" operator, defining that the values of the appropriate attribute (the literals relevant to it) have to contain such substring.

In this manner, the user interface can be used to generate a formulated query by populating one or more query elements and arranging multiple query elements in various forms indicating desired hierarchical structural and logical relationships. Further, each query element can include a populated class and can contain one or more populated attribute-literal pairs, wherein the attribute-literal pairs can also be arranged in various forms indicating desired logical hierarchical relationships. Thus, a variety of simple or complex queries can be easily formulated, which in turn can be used to obtain desired search results.

It is specifically intended that the present invention not be limited to the embodiments and illustrations contained herein, but include modified forms of those embodiments including portions of the embodiments and combinations of elements of different embodiments as come within the scope of the following claims. In particular, the visualization form, implementation technology, interaction and organization model of client-server communication as well as user interaction techniques can differ between various embodiments. Visualization forms can be graphical as well as textual. As described above, the visual form of the structural query may be graphical and resemble UML (Unified Modeling Language) object diagrams, but is not limited to this form. A UML-like form is able to express query elements (e.g. as rectangles), their content (e.g. classes and possibly one attribute-literal pair or a logical hierarchical structure of more attribute-literal pairs), and relations (e.g. as lines connecting query elements). But the structural query can be expressed and constructed in other suitable ways, for example also as structured text or even pseudo-natural text, still using the described methods of query construction and populating of query elements.

Besides a complex editor allowing construction and definition of all the above described segments of the structural query, and providing possibly also some other options like working with data types or filtering of values offered to the user, there can still (co)exist a simplified editor, not capable of constructing and defining a full featured query, but providing a simplified functionality and operation. Such an editor could be used to construct simple queries or to fill query elements which don't need to specify a complex attribute-literal structure. It can be a complement to the complex editor.

To reduce the amount of work related to query creation, a user can save a part of an already defined structural query and later use it as a base of a new query, or append it to an already constructed query.

We claim:

1. A user interface for building a formulated query to search a database of structural data organized by classes, attributes of classes, literals of attributes, and structural relations between classes, and for displaying results of the formulated query, the user interface comprising:

an interface service supported by a computerized device, wherein the computerized device is a computer or other microprocessor based controller having one or more non-transitory digital data storage spaces, and wherein the interface service is configured to cause displaying of each of:

a structural query section to define constraints for the formulated query, the structural query section including one or more first query elements to be populated and allowing for adding of one or more additional query elements, wherein at least one relationship between two or more of the query elements is expressible using at least one defined structural relation, wherein the query elements are graphically displayed as including element connectors by which the at least one defined structural relation can be established, and wherein the element connectors are selectable so as to allow for the adding of the one or more additional query elements to occur above, below, or in between at least some of the first query elements; and a query results section for displaying the results of the formulated query after the formulated query is executed, wherein each query element has a respective class portion which is automatically populated or populated by designating a respective one of a special class identifier and a concrete class identifier, wherein each query element further includes a respective attribute portion which is automatically populated or populated by designating a respective one of a special attribute identifier and a concrete attribute identifier, wherein the two or more query elements include a first query element and a second query element, wherein the respective class portion of the first query element is a first class portion wherein the respective class portion of the second query element is a second class portion, wherein the first class portion is populated by designating a first special class identifier that is a variable identifier signifying a user desire for one or more possible items to be identified based upon a variable input that are then available as one or more of the results, wherein the at least one defined structural relation includes a first defined structural relation, wherein the first defined structural relation expresses a hierarchical structural relationship that is a first relationship of the at least one relationship, and wherein the first defined structural relation is a contains relation according to which the second class portion of the second query element is contained by the first class portion of the first query element.

2. The user interface of claim 1, wherein one or more additional relationships between the two or more query elements or between two or more query element portions are expressible using logical relations.

3. The user interface of claim 2, wherein the logical relations include one or more of a logical AND relation, a logical OR relation, and a logical XOR relation.

4. The user interface of claim 1, wherein the second class portion is automatically populated or populated by designating a concrete class identifier from an offered list, the user interface further including an offer section which displays the offered list.

5. The user interface of claim 4, wherein the offered list includes a first class list of actual classes corresponding to the data in the database and satisfying one or more of the defined constraints for the formulated query.

6. The user interface of claim 1, wherein the respective one of the special attribute identifier and the concrete attribute identifier is selected from one of a first attribute list including all possible attributes defined by a structural data scheme of the database and a second attribute list including actual attributes corresponding to the data in the database.

7. The user interface of claim 1, wherein each query element further includes a respective literal portion in a mathematical relationship with the attribute portion, wherein the respective literal portion is automatically populated or populated by designating a respective one of a special literal identifier and a concrete literal value from an offered list.

8. The user interface of claim 7, wherein the respective one of the special literal identifier and the concrete literal value is expressible using one or more of a specific value, a desired range of values, and a desired set of values.

9. The user interface of claim 7, wherein the mathematical relationship between the respective attribute portion and the respective literal portion is expressible using a mathematical operator including at least one of a greater than operator, a less than operator, a greater than or equal to operator, and a less than or equal to operator.

10. The user interface of claim 1, wherein the computerized device is configured to operate either in association with another computerized device that supports, or to additionally support, an interface portal having both a user display and a user input device.

11. The user interface of claim 4, wherein the offered list is a first class list including all possible classes defined by a structural data scheme of the database.

12. A method for searching data and retrieving objects according to desired search parameters, the method comprising:
    displaying a field within which a query can be graphically viewed both when being formulated and upon being completed;
    receiving a command that the query be formulated;
    providing a first query element for graphical viewing within the field, the first query element capable of being populated so as to define first search constraints, wherein the first query element includes a first class portion serving as a prompt to receive class identifier information and an additional portion serving as a prompt to receive attribute identifier information and literal identifier information,
    receiving at least one first input and, in response, populating the first query element with the class identifier information and one or more of the attribute identifier information and literal identifier information, the populating with the class identifier information being performed by designating a special class identifier that is a variable identifier signifying a user desire for one or more possible items to be identified based upon a variable input,
    receiving at least one second input by which a connector associated with the first query element is selected,
    providing, in response, an additional query element for graphical viewing within the field, wherein the additional query element includes a second class portion and a second additional portion,
    populating the additional query element,
    wherein a hierarchical relationship between the first query element and the additional query element is defined as a contains relation according to which the first class portion contains the second class portion and the query is formulated based at least in part upon the populating of the first and additional query elements and the hierarchical relationship,
    executing a run query command according to the formulated query, and
    displaying results in a query results section.

13. The method of claim 12, wherein the offered list is one of a first class list including all possible classes defined by a structural data scheme of the database and a second class list of actual classes corresponding to the data in the database and satisfying one or more of the defined search constraints.

14. The method of claim 13 further including providing a first attribute portion of the additional portion of the first query element and populating the attribute portion automatically or by designating one of a special attribute identifier and a concrete attribute identifier.

15. The method of claim 14, further including defining a logical relationship between the first attribute portion of the first query element and another attribute portion of the same query element.

16. The method of claim 14, further including providing a literal portion of the additional portion of the first query element and populating the literal portion automatically or using one or more of a concrete value, a special identifier, a desired range of values, and a desired set of values.

17. The method of claim 16, wherein an operational relationship between the first attribute identifier and the first literal identifier is expressed using a mathematical operator including a greater than operator, a less than operator, a greater than or equal to operator, and a less than or equal to operator.

18. The method of claim 12, wherein a further relationship between two or more query elements or two or more query element portions is expressible using at least one of a logical AND relation, a logical OR relation, and a logical XOR relation.

19. A system for searching data and retrieving data results according to desired search parameters, the system comprising:
    a database containing the data in a structural form organized according to classes, class relations, attributes of classes, and literals of attributes,
    a query processor in communication with the database,
    a user interface in communication with the query processor, the user interface operating to generate a formulated query and including a structural query section to define constraints for the formulated query, the structural query section including one or more query elements to be populated and allowing for adding of one or more additional query elements, and wherein a relationship between first and second ones of the query elements is a hierarchical relationship and is expressible using a defined structural relation that is a contains relation between first and second classes of the first and second query elements, the user interface further including a query results section for displaying results of the formulated query after the formulated query is executed; and
    wherein the query processor receives the formulated query and generates the data results of objects that satisfy the query by searching the database,
    wherein at least one part of the formulated query can be saved for use in constructing a further query in which the at least one part of the formulated query is appended to an already-constructed query, and
    wherein at least one of the query elements has designation areas to specify each of a first class, a first attribute, and a first literal, wherein one or more of the designation areas are populated by designating at least one special class identifier that is a variable identifier signifying a user desire for one or more possible items to be identified based upon a variable input that are then available as one or more of the data results.

20. The system of claim 19, wherein an additional relationship between query element portions is expressible using one or more of a logical AND relation, a logical OR relation, and a logical XOR relation.

21. The system of claim 19, wherein at least one or more additional ones of the designation areas are populated by designating at least one concrete item from one or more offered lists, and wherein the user interface further includes an offer section which displays the one or more offered lists.

22. The system of claim 21, wherein the one or more offered lists include three or more of a first class list including all possible classes defined by a structural data scheme of the database, a second class list of actual classes corresponding to the data in the database and satisfying one or more of the defined constraints, a first attribute list including all possible attributes defined by a structural data scheme of the database, a second attribute list of actual attributes corresponding to the data in the database and a list of actual literal values corresponding to the data in the database, and wherein a first of the offered lists relates to one of the class lists, a second of the offered lists relates to one of the attribute lists, and a third of the offered lists includes the list of actual literal values.

23. The system of claim 19, wherein an operational relationship between a first attribute and a first literal is expressible using one or more mathematical operators including a greater than operator, a less than operator, a greater than or equal to operator, and a less than or equal to operator.

24. The system of claim 19, wherein the data in the structural form includes industrial data and the user interface includes a user display that is an industrial monitor.

25. A user interface system comprising:
  an interface service supported by a computerized device, wherein the computerized device is a computer or other microprocessor based controller having one or more non-transitory digital data storage spaces, and wherein the interface service is configured to cause displaying of each of:
  a structural query section for displaying a formulated query including a plurality of query elements interrelated by one or more structural relations, wherein each query element has a respective class portion that can be populated and a respective attribute portion that can be populated, wherein the plurality of query elements includes a first query element having a first class portion, a second query element having a second class portion, and a third query element having a third class portion that are in a hierarchical relationship, wherein the first class portion contains the second class portion, the second class portion contains the third class portion and, the hierarchical relationship is transitive such that the first class portion additionally contains the third class portion;
  an offer section for displaying one or more lists that include one or more concrete identifiers that can be selected to allow for populating of at least one of the respective class portions, wherein at least one of the respective class portions is populated by designating a first special class identifier that is a variable identifier signifying a user desire for one or more possible items to be identified based upon a variable input, wherein the interface service is configured to cause an explorative query to be performed at at least one database so as to result in a searching of structural data stored at the at least one database, wherein the explorative query takes into account at least one already-existing query-related constraint, and wherein the one or more lists including the one or more concrete identifiers are generated as a result of the explorative query; and
  a query results section for displaying results of the formulated query after the formulated query is executed.

26. The user interface of claim 25, wherein (a) the interface service is further configured to allow for receipt of one or more user commands in response to which the respective class portion and the respective attribute portion of each of the plurality of query elements is populated.

27. The user interface of claim 26, wherein (b) the interface service is also configured to cause further displaying of designation areas providing prompts for class and attribute information and by which the receipt of the user commands occurs.

28. The user interface of claim 27, wherein
  (c) the user commands are indicative of selections of the class information and attribute information from among the one or more concrete identifiers and one or more special identifiers.

29. The user interface of claim 28, wherein
  (d) the results of the executing of the formulated query are received by the computerized device from at least one database with which the computerized device is in communication.

30. The user interface of claim 29, wherein
  (e) each query element additionally has a respective literal portion, and
  (f) the interface service is further configured to allow for receipt of one or more additional user commands in response to which the literal portion of each of the query elements is populated.

31. The user interface of claim 30, wherein related by way of a structural relation that is a contains relation; and
  (g) at least a pair of query elements of the plurality of query elements are related by way of a logical relation that includes one of a logical AND relation, a logical OR relation, or a logical XOR relation.

32. The user interface of claim 31, wherein either
  (h) the computerized device also serves to provide an interface portal on which the structural query section and the query results section are both displayed in accordance with one or more signals from the interface service; or
  (i) the computerized device is configured for interaction with a further device on which is supported an interface portal on which the structural query section and the query results section are both displayed in accordance with one or more signals from the interface service.

\* \* \* \* \*